(12) United States Patent
Thomas et al.

(10) Patent No.: US 8,246,303 B2
(45) Date of Patent: Aug. 21, 2012

(54) ACTIVE TWIST HOLLOW BEAM SYSTEM

(75) Inventors: James P Thomas, Alexandria, VA (US); Michael J O'Brien, Los Angeles, CA (US); William R Pogue, III, Easton, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 891 days.

(21) Appl. No.: 12/233,244

(22) Filed: Sep. 18, 2008

(65) Prior Publication Data

US 2011/0064579 A1 Mar. 17, 2011

Related U.S. Application Data

(60) Provisional application No. 61/084,356, filed on Jul. 29, 2008.

(51) Int. Cl.
*F01D 5/00* (2006.01)
(52) U.S. Cl. .......................................................... 416/23
(58) Field of Classification Search .................... 416/23, 416/24
See application file for complete search history.

(56) References Cited

U.S. PATENT DOCUMENTS

| | | | | |
|---|---|---|---|---|
| 5,137,228 | A * | 8/1992 | Vaughen | 244/17.25 |
| 5,288,039 | A * | 2/1994 | DeLaurier et al. | 244/219 |
| 5,505,589 | A | 4/1996 | Bergey | |
| 5,681,014 | A | 10/1997 | Palmer | |
| 5,685,149 | A * | 11/1997 | Schneider et al. | 60/528 |
| 6,024,325 | A | 2/2000 | Carter, Jr. | |
| 6,065,934 | A | 5/2000 | Jacot et al. | |
| 6,419,187 | B1 * | 7/2002 | Buter et al. | 244/35 R |
| 6,497,385 | B1 | 12/2002 | Wachspress et al. | |
| 6,970,773 | B2 | 11/2005 | Phillips | |

(Continued)

FOREIGN PATENT DOCUMENTS

FR 2833571 A1 * 6/2003

(Continued)

OTHER PUBLICATIONS

Bothwell, C. et al., "Torsional Actuation with Extension-Torsion Composite Coupling and a Magnetorestrictive Actuator", AIAA Journal, vol. 33, Issue 4, p. 723-729, Apr. 1995.

(Continued)

*Primary Examiner* — Kiesha Bryant
*Assistant Examiner* — Mark Tornow
(74) *Attorney, Agent, or Firm* — Amy Ressing; Sally A. Ferrett

(57) ABSTRACT

A system for actively controlling the span-wise rotational twist of a hollow beam along its longitudinal axis, including a hollow beam structure having a leading edge and a trailing edge region, the beam being split along its length, an actuator arranged between split surfaces of the beam, the actuator adapted to move the split surfaces in a longitudinal direction relative to each other, inducing a twist in the beam. In one embodiment, the actuator is a plurality of thermal expansion material blocks alternating with mechanical compression blocks, the thermal expansion material blocks being heated to cause expansion in the spanwise longitudinal direction. Other alternative actuators include a rotary actuators such as a threaded screw, piezoelectric or magnetostrictive blocks, a hydraulic actuator, or a pneumatic actuator. In an embodiment, the beam is an airfoil shape.

14 Claims, 19 Drawing Sheets

U.S. PATENT DOCUMENTS 7,692,361 B2 * 4/2010 Kato et al. .................... 310/328
7,726,603 B2 * 6/2010 Mercier Des Rochettes
 et al. ............................ 244/99.8

FOREIGN PATENT DOCUMENTS

GB          2348537 A  * 10/2000

OTHER PUBLICATIONS

Chen, P., and Chopra, I., "Hover Testing of Smart Rotor with Induced-Strain Actuation of Blade Twist", AIAA Journal, vol. 35, Issue 1, p. 6-16, Jan. 1997.

Chopra, I., "Status of Application of Smart Structures Technology to Rotorcraft Systems", J. Amer. Helicopter Society, vol. 45, No. 4, 2000, pp. 228-252.

Derham, R., et al., "Design Evolution of an Active Materials Rotor", Proceedings AHS 57th Annual Forum, 17 pages, May 2001.

Guirgiutiu, V., "Recent Advances in Smart-material Rotor Control Actuation", Proceedings of the 41st AIAA/ASME/AHS/ASC Structures, Structural Dynamics, and Materials Conference, Paper AIAA#2000-1709, 11 pages, Apr. 2000.

Monner, H.P., Wierach, P., "Overview of smart-structures technology at the German Aerospace Center", Sep. 2005, Institute of Mechanical Engineers, [online], [retrieved on Sep. 18, 2009] < URL: http://en.scientificcommons.org/22987946>.

Riemenschneider, J., Keye, S., Wierach, P., Des Rochettes, H.M., "Overview of the Common DLR/ONERA Project 'Active Twist Blade (ATB)'", 30th European Rotorcraft Forum, Sep. 14, 2004-Sep. 16, 2004, Marseilles, France, 9 pages, 2004.

Wierach, P., Riemenschneider, J., Keye, S., "Development of an Active Twist Rotor Blade with Distributed Actuation and Orthotropic Material", Smart Structures and Materials 2005: Smart Structures and Integrated Systems, Proceedings of SPIE vol. 5764, p. 183-191, May 2005.

Wilbur, M. et al., "Hover Testing of the NASA/Army/MIT Active Twist Rotor Prototype Blade", AHS 56th Annual Forum, 14 pages, May 2000.

* cited by examiner

CASE I (MID-SPAN)

CASE I (TIP)

CASE II (MID-SPAN)

CASE II (TIP)

ACTIVE TWIST HOLLOW BEAM SYSTEM

CROSS REFERENCE TO RELATED APPLICATIONS

This application is a nonprovisional application under 35 U.S.C. §119(e) of provisional application No. 61/084,356, filed on Jul. 29, 2008, which is incorporated herein by reference in its entirety.

BACKGROUND

1. Field of the Invention

This invention is related generally to a method for inducing span-wise twist in hollow beams such as airfoils or rotor blades using a shear warp actuator that is integrated into the beam along its span.

2. Related Technology

Most airfoil blades, once made, cannot change their twist (relative cross-section rotational) along the blade span. Many non-rotating blade systems (e.g., airplane wings and control surfaces) have no built-in twist, whereas many of the rotating airfoil blade systems (e.g., helicopter rotor blades) have some fixed amount of twist built into them. Recent research and development has been focused on active twist control of helicopter rotor blade systems primarily for mitigation of aerodynamically-induced vibrations, as discussed in Chopra, I., "Status of Application of Smart Structures Technology to Rotorcraft Systems", J. Amer. Helicopter Soc., Vol. 45, No. 4, 2000, pp. 228-252, and Giurgiutiu, V. "Recent Advances in Smart-Material Rotor Control Actuation", AIAA Paper #2000-1709, in Proc. 41st AIAA/ASME/ASCE.AHS/ASC Structures, Structural Dynamics, and Materials Conference, Atlanta, Ga.

Some developments in active control of rotor blade twist are described in: Chen, P., and Chopra, I., "Hover Testing of Smart Rotor with Induced-Strain Actuation of Blade Twist", AIAA Journal, Vol. 35, 1997; Wilbur, M. et al., "Hover Testing of the NASA/Army/MIT Active Twist Rotor Prototype Blade", AHS 56th Annual Forum, May 2000; Bothwell, C. et al., "Torsional Actuation with Extension-Torsion Composite Coupling and a Magnetostrictive Actuator", AIAA Journal, Vol. 33, 1995; Derham, R. et al., "Design Evolution of an Active Materials Rotor", in Proc. AHS 57th Annual Forum, May 2001; and Jacot et al., U.S. Patent No. 6,065,934, entitled "Shape Memory Rotary Actuator". U.S. Pat. No. 6,970,773 to Phillips discloses a system for inducing an optimized twist distribution for a wing. U.S. Pat. No. 5,681,014 to Palmer discloses a torque tube-based system for twisting an airfoil. U.S. Pat. No. 5,505,589 to Bergey discloses a controllable variable twist rotor blade assembly for rotary wing aircraft. U.S. Pat. No. 6,024,325 to Carter, Jr. discloses a coil-spring system for controlling pitch of a rotor for a rotary wing aircraft. U.S. Pat. No. 6,065,934 to Jacot et al. discloses a shape memory rotary actuator for a rotor blade. U.S. Pat. No. 6,497,385 to Wachpress et al. discloses a rotor blade with optimized twist distribution.

These active twist systems typically use piezoelectric or magnetostrictive actuators embedded in the composite structure of closed-section rotor blades. The large torsional rigidity of the closed cross-section blades requires large actuation forces to achieve a given degree of twist. Active-twist designs with structure-embedded actuation have so-far been limited to a few degrees of twist or less over the length of the blade. Deformation of closed-section beams by embedded or external actuators requires large amounts of actuation force and energy because of the large elastic stiffness and strain energy associated with the deforming member under twist.

SUMMARY

An embodiment of the invention is directed to an active twist hollow beam system having a hollow beam that is split along the longitudinal length of the beam, and an actuator arranged to move split surfaces of the beam in a longitudinal direction relative to each other along the length of the beam, inducing a twist in the beam. The actuator can be arranged between split surfaces of the beam. The beam can be an aircraft propellor, wing, control surface, or rotor blade.

The beam can be a helicopter rotor blade, turbine blade, underwater vehicle control surface, or robotic appendage.

The system can include a plurality of shear-warp actuators, each actuator arranged at a beam section at a different longitudinal position along the beam, each actuator independently controlled to induce different twist amounts to the beam sections.

The actuator can include a number of thermal expansion material blocks arranged to expand in the longitudinal direction of the beam and move the split surfaces relative to each other in the longitudinal direction. The actuator can also include an electrical resistance coil in contact with the thermal expansion blocks. The actuator can also include a plurality of mechanical compression blocks, arranged in an alternating pattern with the thermal expansion blocks.

The actuator can include thermal actuator blocks and an electrical resistance coil, piezoelectric or magnetostrictive material blocks, a hydraulic actuator, a pneumatic actuator, or a threaded screw extending along the longitudinal direction of the hollow beam.

An embodiment of the system is directed to an active twist hollow beam system including a hollow beam that is split along the longitudinal length of the beam, and a rotary actuator arranged in an interior of the beam and extending along the longitudinal direction of the beam. The rotary actuator is axially fixed with respect to a first one of the split surfaces, the rotary actuator being matingly engaged with a second one of the split surfaces, wherein turning the rotary actuator moves the split surfaces of the beam in a longitudinal direction relative to each other along the length of the beam, inducing a twist in the beam.

The rotary actuator can include a threaded screw extending in the longitudinal direction of the beam, the threaded screw axially fixed with respect to a first one of the split surfaces, the threaded screw having a thread matched to an internal thread of a second one of the split surfaces, wherein turning the threaded screw moves the second split surface in a longitudinal direction with respect to the first split surface. The split surfaces of the beam can be restricted in motion to the longitudinal direction.

Additional details will be apparent from the following Brief Description of the Drawings and Detailed Description.

DETAILED DESCRIPTION OF THE INVENTION

Embodiments of the invention are directed to an active twist system that permits the use of low actuator loads/power to achieve a large degree of span-wise twist in a beam. The active twist system described herein avoids storing significant amounts of elastic strain energy in the beam under twisting, or "rotational" deformations.

Figure 1A:
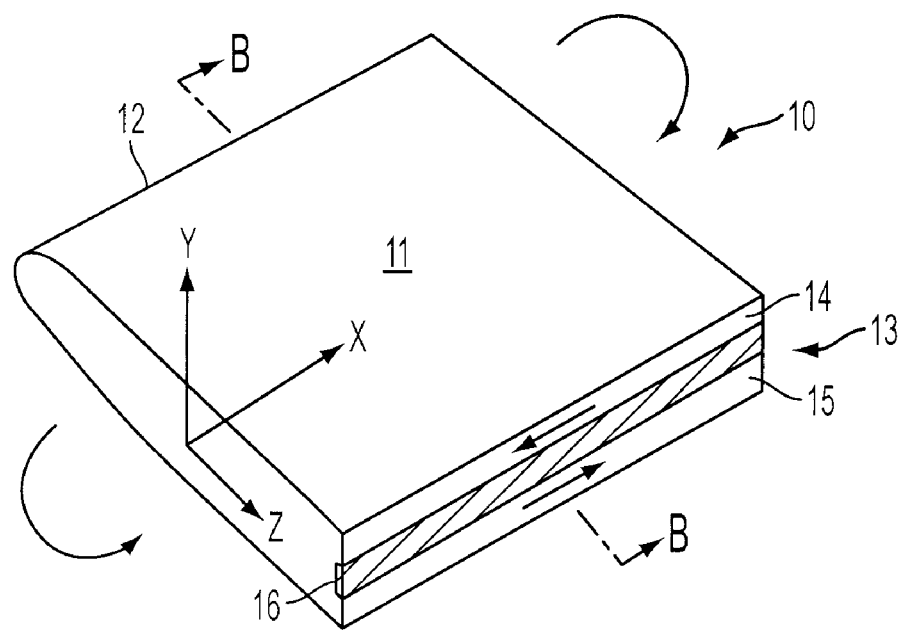
FIGS. 1A and 1B illustrates an active twist hollow beam system in accordance with an embodiment of the invention.
Figure 1B:
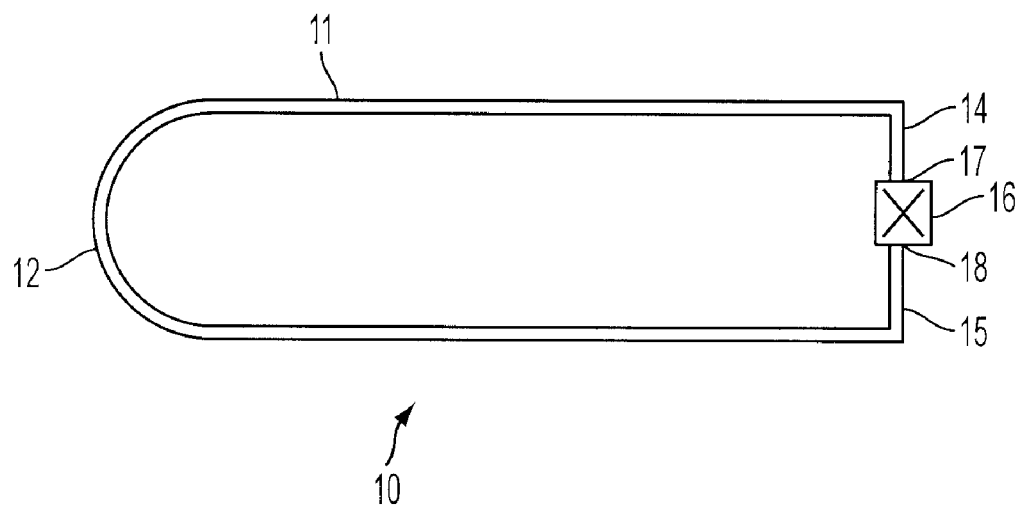

The active twist system can be incorporated into any hollow beam. FIGS. 1A and 1B illustrates an active twist system 10 in accordance with an embodiment of the invention in which the beam is a spar section for an airfoil. The hollow spar beam 11 has a leading edge 12 and a trailing edge 13 opposite the leading edge. The trailing edge 13 is split lengthwise along the span of the spar beam, with two planar surfaces 14 and 15 separated by a space. When the planar sections 14 and 15 are displaced in opposite directions along the lengthwise (span-wise) axis of the airfoil (x axis), the resulting out-of-plane warping deformations induce an angular twist of the spar beam.

As shown in FIG. 1B, a shear-warp actuator 16 is positioned between the beam edges 17 and 18 along the span of the beam 11.

To form the hollow spar beam 11 of FIG. 1B, a lengthwise strip of material can be removed from a closed-section hollow airfoil beam and the strip can be replaced by a shear-warp actuator that controls the relative lengthwise shear displacement (warp) between the edges 17 and 18 of the cut along the span of the beam 11.

Alternatively, the airfoil beam 11 can initially be formed to have a separation or split along the longitudinal length or span of the beam, so no material is required to be removed.

As shown in FIGS. 1A and 1B, the trailing edge 13 of the spar beam 11 is split at a midpoint along the trailing edge. However, the location for the split can be selected based on mechanical loading state of the beam, center-of-gravity position, centrifugal loading effects, and other factors. The split can be located anywhere on the cross section, including at other positions in the trailing edge, on the leading edge, or in one of the planar surfaces 14 and 15. The torsional stiffness of the active twist beam system (spar beam plus integrated actuator) will depend on the hollow beam's material properties and geometry and the actuator's geometry and material stiffness properties.

Figure 2:
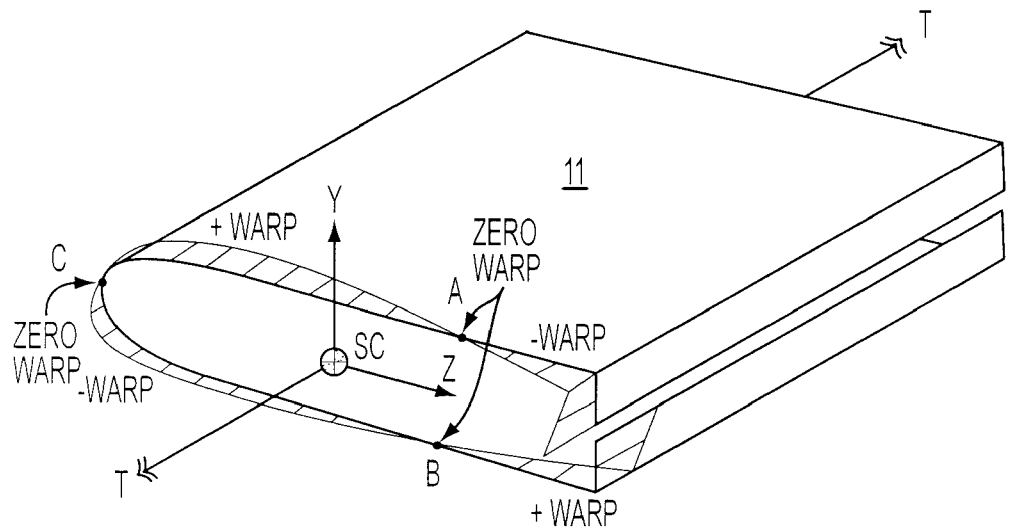
FIG. 2 illustrates warping behavior of an open-section beam under a torsional moment T.

When energized, the shear-warp actuator 16 moves the beam sections 14 and 15 in opposite directions along the span of the beam in the positive and negative directions. This warp, or displacement, of the beam sections 14 and 15 in opposite directions, twists the hollow beam 11 as shown in FIG. 2. There is a discontinuous jump in the warp displacement on each side of the cut or split, and there are three points A, B, and C on the cross-section that experience no warping displacement.

Figure 3:
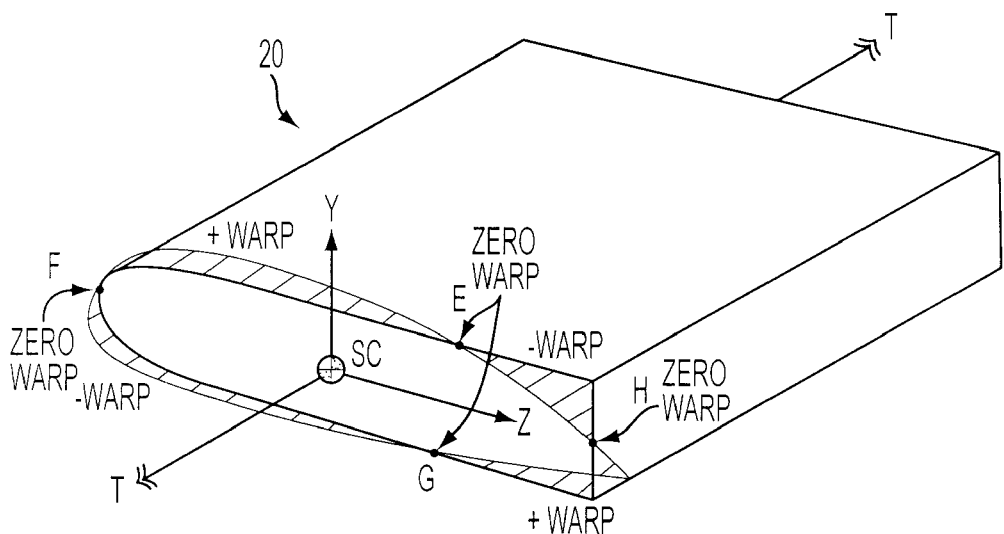
FIG. 3 illustrates warping behavior of a closed-section beam under a torsional moment T.

In contrast, for a hollow closed-section beam 20 in FIG. 3, the warping displacement under an applied torque, T, varies continuously, without any discontinuities or jumps, and there are four points E, F, G, and H on the cross-section that experience no warping (zero-warp points). The magnitude of the warping displacement for the hollow open-section beam 11 of FIG. 2 is much larger than that experienced by hollow closed-section beam of FIG. 3 for a given applied torque.

The active twist system 10 described herein exhibits characteristics of both open-section and closed-section beams. The required force-displacement characteristics of the shear-warp actuator are governed by the open-section beam mechanics. The torsional stiffness of the combined open-section beam 11 plus shear-warp actuator 16 is governed by the beam materials and geometry and the actuator stiffness. The warping stiffness of the actuator 16 can be selected so that the torsional stiffness of the combined open-section beam with integrated shear-warp actuator equals or exceeds the torsional stiffness of the equivalent closed-section beam.

The shear-warp actuator 16 is integrated with the beam 11 through physical connection at the cross-section cut edges 17 and 18. It is suitable to match the shear stiffness of the shear-warp actuator 16 (in the activated and non-activated states) to that of the equivalent material in a closed-section beam if the apparent torsional stiffness of the active twist airfoil system is to equal that of its closed-section equivalent. The elastic strain energy per unit length of a torsional spring, $k_{torsion}\theta^2$, is proportional to its elastic stiffness, $k_{torsion}$, and the square of the twist per unit length, θ.

The active twist hollow beam system 10 uses small out-of-plane warping displacements to achieve a given level of beam twist by taking advantage of the naturally low elastic torsional stiffness of an open beam (i.e., one with a lengthwise cut) relative to that of an otherwise identical closed-section beam.

The torsional stiffness of open-section beams can be one-tenth or less that of closed-section beams with equivalent dimensions, and hence, the amount of elastic strain energy locked into the beam structure during twist is one-tenth or less that of such closed-section equivalents. Actuator weight, size, and power requirements can be important factors governing the viability of an active twist system.

The shear-warp actuator 16 for the active twist system can tailor the warping force-displacement behavior and the apparent shear stiffness. The shear-warp actuator 16 can be a thermal actuator, a screw-based actuator, a piezoelectric actuator, or another type of actuator that can generate shear displacement and has controllable shear stiffness.

The center of the beam 11 is preferably hollow, or partially hollow, so as to allow the airfoil to warp. Some interior structure can be present, depending on the warping force-displacement and shear stiffness requirements of a particular application. For example, rotor blades can have a foam core or a honeycomb structure in their interior.

Figure 4:
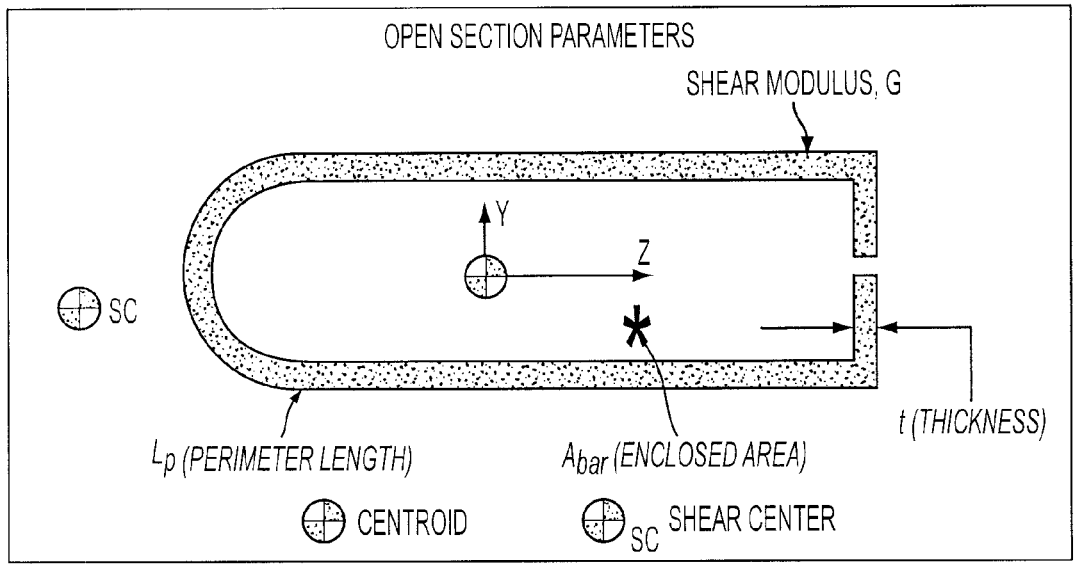
FIGS. 4 and 5 illustrate material and geometric parameters of open and closed section beams, respectively.
Figure 5:
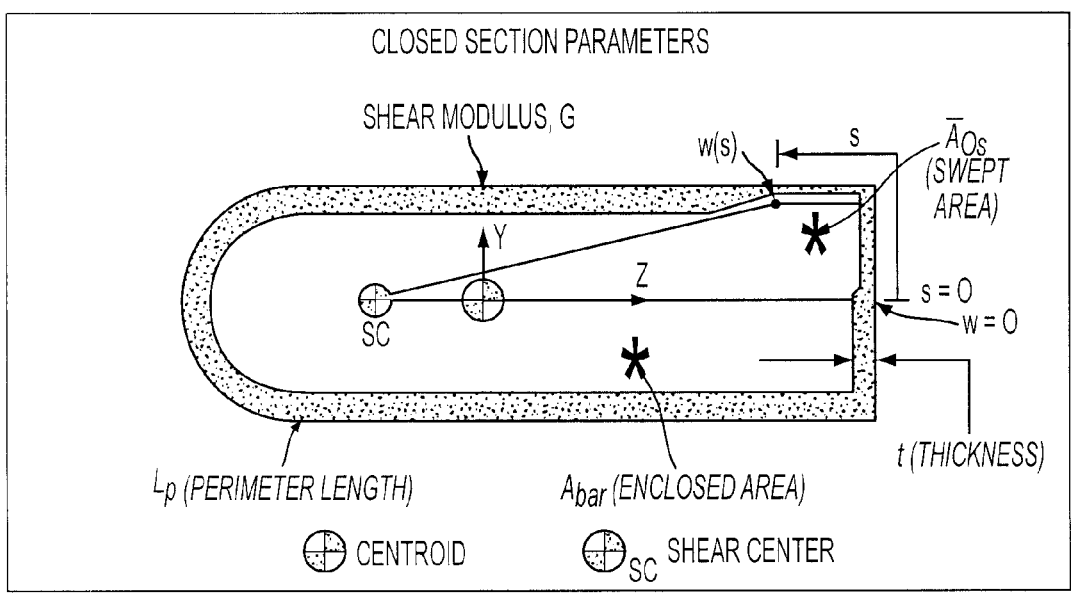

Approximate relationships between the relative warping displacement at the longitudinal cut along the trailing edge of the beam 11, shear-flow, and beam twist of an open-section beam that is symmetric about the z-axis can be derived from mechanics by the following equation, in which w is the warp displacement, $A_{BAR}$ is the median enclosed area, θ is the twist per unit length, T is the applied torque, G is the shear modulus, $L_p$ is the cross-section perimeter length, t is the material thickness, and q is the shear flow acting along any lengthwise cut that is equivalent to the applied torque T. These parameters are shown in FIGS. 4 and 5 for open-section beams and closed-section beams, respectively.

$$w = 2A_{BAR}\theta = 6A_{BAR}\frac{T}{GL_p t^3} = \frac{12A_{BAR}^2}{GL_p t^3}q \qquad \text{Equation (1)}$$

Equation (1) defines the shear force-warping displacement (q-w) characteristics of the open-section beam that must be matched to the shear-warp actuator, and the design parameters shown in equations (5)-(7) can be used to design an actuator that meets the required q-w characteristics.

For the closed-section beam, relationships between the warping displacement, shear-flow, and beam twist can also be derived. The warping displacement is w(s) at location s on the cross section, T is the applied torque, $A_{OS}$ is the area swept by a line connecting the cross-section's shear center to a point on the cross-section starting from the point on the cross-section where the z-axis intersects, $A_{BAR}$ is the median enclosed area, q is the shear flow acting along any imaginary lengthwise cut that is equivalent to the applied torque, and θ is the twist per unit length. The relationships between the warping displacement, shear-flow, and beam twist can be described by:

$$w(s) = \frac{T\delta}{2A_{OS}}\left(\frac{\delta_{OS}}{\delta} - \frac{A_{OS}}{A_{BAR}}\right) = \delta\left(\frac{\delta_{OS}}{\delta} - \frac{A_{OS}}{A_{BAR}}\right)q \qquad \text{Equation (2)}$$

and $$\theta = \frac{\delta}{2A_{OS}}q \text{ where} \qquad \text{Equation (3)}$$

$$\delta = \oint \frac{ds}{Gt} \text{ and } \delta_{OS} = \int_0^s \frac{ds}{Gt}. \qquad \text{Equation (4)}$$

For a open beam section, having a portion of the trailing edge replaced by a warp actuator, equations (2) and (4) determine the required actuator stiffness that would be equivalent to the beam material replaced by the warp actuator. These equations can be used to design actuators that meet the warping stiffness requirements for a particular application.

The material in the trailing edge of the closed section beam cross section of FIG. 5, located between ±s, centered at the intersection of the Z axis with the trailing edge, has an apparent warping stiffness of q/2w. The apparent warping stiffness can be matched by an actuator integrated with an open section beam. In performing the design calculations, one can calculate 2 times w for the closed section beam with a given applied torque, T, which is equivalent to a shear flow, q, at a distance s set equal to one-half of the actuator height.

Recall from FIGS. 2 and 3 that, for symmetric open-section beams, there will be three points on the cross-section that experience no warping, and for symmetric closed-section beams, there will be four points on the cross-section that experience no warping. The exact locations of the zero-warping points on the cross section depends on the beam's material and cross section geometry.

Figure 6A:
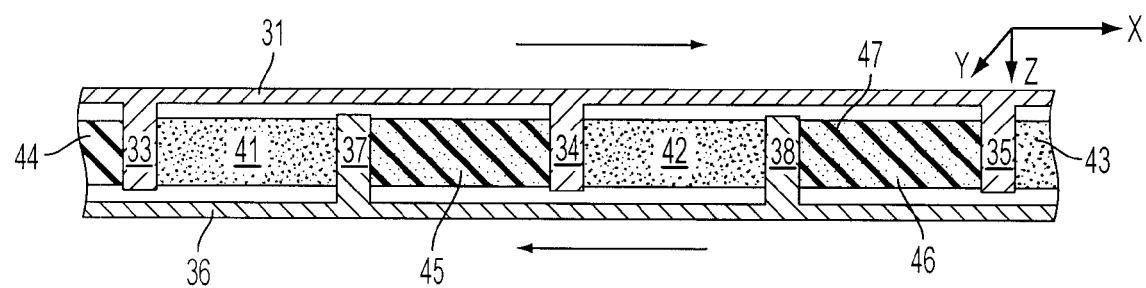
FIGS. 6A and 6B illustrate a thermally-based actuator for an active twist system in accordance with an embodiment of the invention.
Figure 6B:
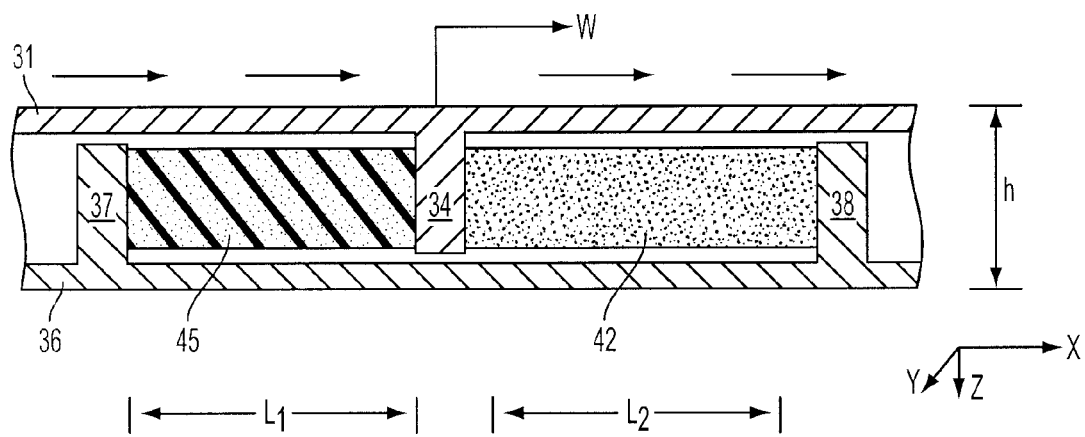

FIGS. 6A and 6B illustrates a section of an exemplary thermal actuator 30 for inducing warp in a beam such as the FIG. 1 beam 11. An upper frame 31 has ribs (e.g., ridges or protrusions) 33, 34, and 35 extending between alternating expansion elements and contraction elements, so each rib has an expansion element on one side and contraction element on the opposite face of the rib. For example, rib 34 has a contraction element 42 on one side and an expansion element 45 on the opposite side. Similarly, the lower frame 36 has ribs 37 and 38, with each rib arranged with an expansion element on one side and a contraction element on the other side. For example, rib 37 has a contraction element 41 on one side and an expansion element 45 on the other side.

Figure 12:
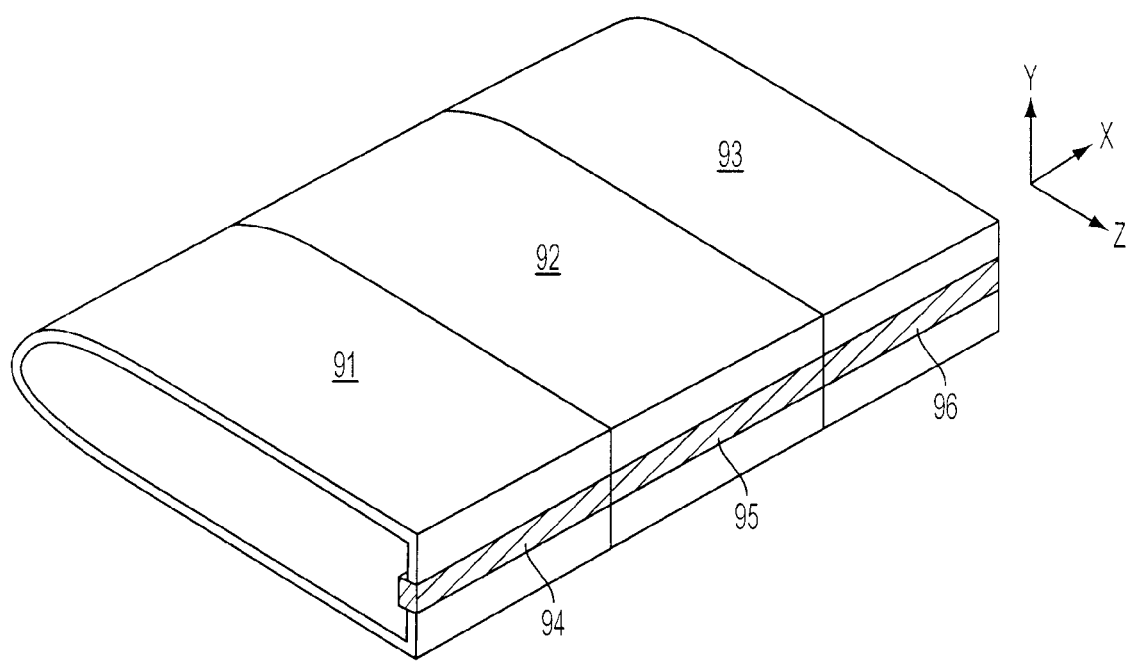
FIG. 12 illustrates a hollow beam with three sections extending in the spanwise direction, each of which is independently controlled with a separate shear-warp actuator.

The thermal expansion elements 44, 45, and 46 can be heated with electrical resistance coils or another suitable heating unit. When heat is removed from the expansion elements, they cool and return to their original dimensions, allowing the frames 31 and 36 to return to their at-rest unactuated positions. The coils can be controlled by a single controller, to apply uniform heat to each of the expansion elements. Alternatively, multiple actuators can independently control different sections of the beam, as shown in FIG. 12.

The thermal expansion elements and mechanical contraction elements are mechanically opposed and alternate in their connection with the upper frame 31 and lower frame 36. Localized heating of the alternating expansion elements causes frame shear via thermal expansion of the expansion elements and contraction of the mechanical contraction elements in a spanwise direction (along the longitudinal x axis). FIG. 6B shows thermal expansion elements 44, 45, and 46 expanding in the x direction when heated, pushing the lower frame 36 in one direction (−x direction, to the left in FIG. 6A), and pushing the upper frame 31 in the opposite direction (+x direction, to the right in FIG. 6A). As the upper and lower frames move in opposite x directions, the frame ribs mechanically compress the compression elements in the x direction.

In an exemplary embodiment, the thermal expansion elements and mechanical compression elements are affixed to the frame ribs with adhesive or mechanical fasteners, in order to prevent the frames from shifting away from each other in the y or z directions. Alternatively, some or all of the expansion and contraction elements can remain unbonded to the frame. If the elements are not bonded to the frame, some other device for preventing the frames from moving in the y and z directions, such as a linear bearing, can be included.

Note that FIGS. 6A and 6B show only the expansion elements as including resistance heating coils. In other embodiments, all the elements include resistance heating coils. When needed, only half of the elements are heated, and the other half of the elements are not heated, in an alternating pattern, so the heated elements act as the expansion elements, and the unheated elements act as the compression elements. The direction of warp/twist can be selected by choosing which elements will expand and which will contract.

The amount of warping displacement that results from a given change in temperature depends on the materials and geometry of the thermal actuation components. The actuator parameters can be selected to obtain a specific warping displacement for a given change in temperature and specific (apparent) shear stiffness.

Assuming that the upper frame 31 and the lower frame 36 are rigid, the displacement or warping w can be predicted by equation (5). The warping displacement is W, $\alpha_1$ is the thermal expansion coefficient of the expansion elements, $E_1$ is the elastic modulus of the expansion elements, $L_1$ is the length of the expansion element in the x direction, $A_1$ is the cross-sectional area of the expansion element, $\Delta T_1$ is the change in temperature of the expansion element material. The term $\alpha_2$ is the thermal expansion coefficient of the compression element, $E_2$ is the elastic modulus of the compression elements, $L_2$ is the length of the compression element in the x direction, $A_2$ is the cross-sectional area of the compression element, $\Delta T_1$ is the change in temperature of the expansion element, $\Delta T_2$ is the change in temperature of the compression element material. The term q is the applied shear flow, which equals the applied shear force, F, divided by the length, $L_1+L_2$. For the condition in which the expansion element is heated ($\Delta T_1>0$) and the compression element has no temperature change ($\Delta T_2=0$), $$w = \left[\frac{\alpha_1 A_1 E_1 \left(\frac{L_1 L_2}{A_2 E_2}\right)}{L_1 + L_2\left(\frac{A_1 E_1}{A_2 E_2}\right)}\right] \times \Delta T_1 + \left[\frac{(L_1 + L_2)\left(\frac{L_1 L_2}{A_2 E_2}\right)}{L_1 + L_2\left(\frac{A_1 E_1}{A_2 E_2}\right)}\right] \times q \quad \text{Equation (5)}$$

It is preferable that the actuator have very small warping displacement when all parts of the actuator are subjected to the same temperature change (i.e., when $\Delta T_1=\Delta T_2=\Delta T\neq 0$), to avoid twist in response to small changes in ambient temperature. Analysis of the warp-actuator under uniform temperature changes and zero external warping forces (i.e., q=0) leads to:

$$w = \left[\frac{\alpha_1 A_1 E_1 - \alpha_2 A_2 E_2}{\frac{A_1 E_1}{L_1} + \frac{A_2 E_2}{L_2}}\right] \times \Delta T \quad \text{Equation (6)}$$

Note that if $\alpha_1 A_1 E_1 - \alpha_2 A_2 E_2 = 0$, there will be zero warping under uniform temperature changes. Therefore, one method of achieving zero warping under uniform temperature changes is to select identical materials and cross-sectional areas for the expansion material block and the compression material block. In this example, $\alpha_1=\alpha_2=\alpha$, $A_1=A_2=A$, and $E_1=E_2=E$. This leads to the following simplification for the warping displacement, which can be used to design a shear actuator for an active twist beam system:

$$w = \left[\frac{\alpha L_1 L_2}{L_1 + L_2}\right] \times \Delta T + \left[\frac{L_1 L_2}{AE}\right] \times q \quad \text{Equation (7)}$$

Specific applications for the active twist system of FIG. 1 include cantilevered applications like aircraft wings, control surfaces, propellors, or helicopter rotor-blades having one end of the airfoil attached at the helicopter rotor hub. In cantilever applications, the active-twist hollow beam system should be mechanically anchored at the zero warping points, to the maximum extent possible, in order to minimize any warping restraint that will alter the open-section beam warping force-displacement characteristics. In an actual active twist system, there may be some degree of warping restraint imposed at the external connections due to the difficulty inherent in mechanically anchoring at exact point connections. The particular configuration of the connection can be an important aspect of the system design. Non-ideal connections (i.e., those that impose warping restraint) can require an actuator force above that predicted by Equation (5), to compensate for the warping restraint and achieve the desired twist.

Figure 7:
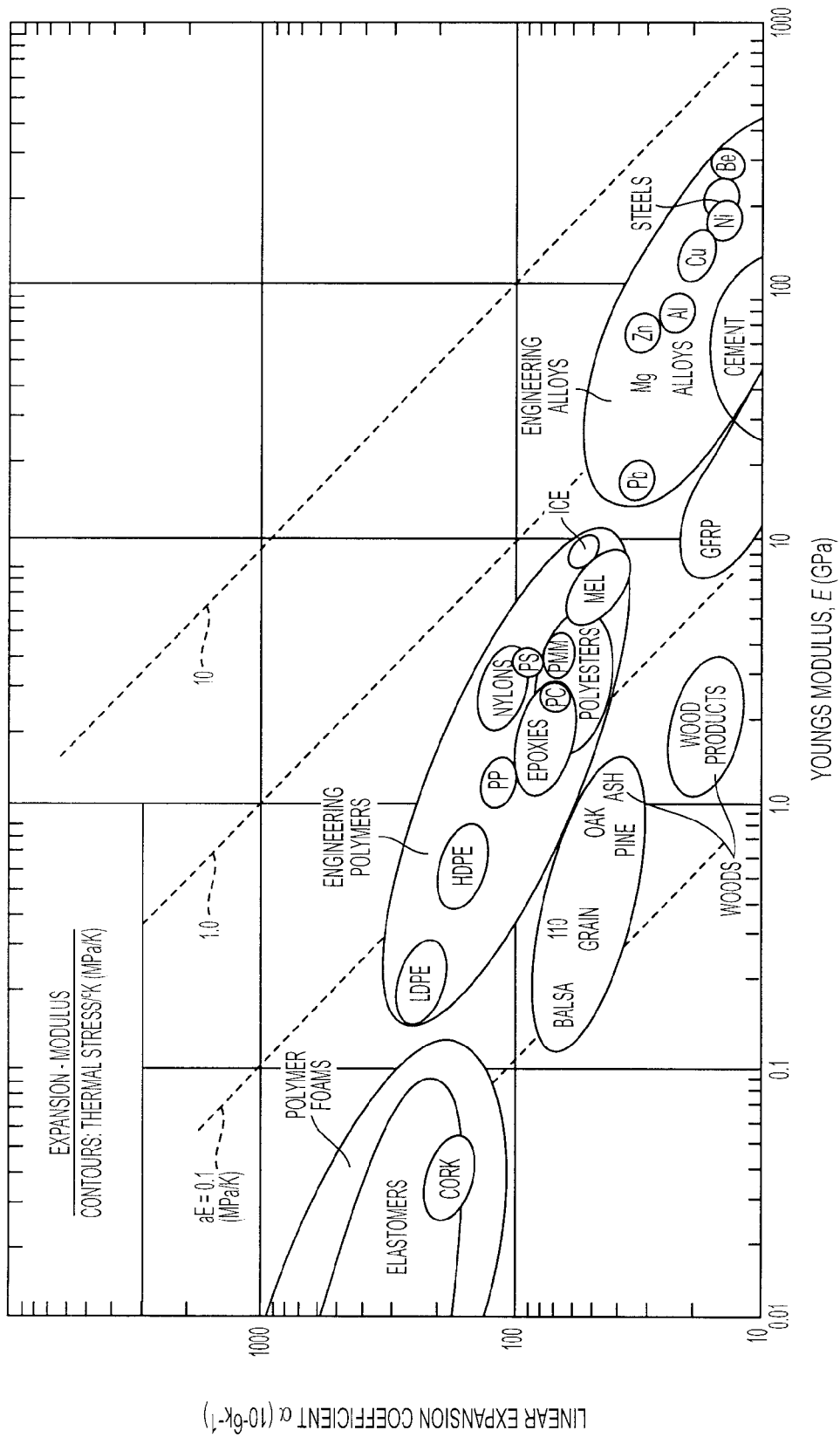
FIG. 7 is a graph illustrating thermal expansion coefficient, α, versus elastic modulus, E, for materials suitable for a thermal actuation element in accordance with an embodiment of the invention.

Selection of materials and dimensions for the thermal actuators that provide the desired twist and stiffness characteristics can be made based on material properties such as thermal expansion coefficient, $\alpha$, versus elastic modulus, E. Each material will have a restriction on the maximum temperature that can be used to affect thermal actuation. The issues of how to best to heat the expanding elements to affect actuation and possible heat-transfer considerations (e.g., need for insulation) to minimize the required heating power and heat transfer to other parts of the system must also be addressed in the design of these types of embodiments of the active-twist hollow beam airfoil system. Suitable tables or graphs of material properties can be used to select materials with a high thermal expansion coefficient and sufficiently high elastic modulus. FIG. 7 shows the Ashby "Materials Performance" plot of thermal expansion coefficient, $\alpha$, versus elastic modulus, E, suitable for identifying materials for the thermal actuator system. The Ashby Materials Performance plot information can be found in "Ashby, M. F., Materials Selection in Mechanical Design, 2nd Ed. Butterworth-Heinemann, Oxford, 1999".

In exemplary embodiments, the thermal expansion elements are engineering elastomers and polymers such as neoprene, butyl, LDPE, HDPE, PP, PS, PC, PMMA, polyesters, epoxies, and MEL with a relatively high linear expansion coefficient $\alpha$.

Figure 8:
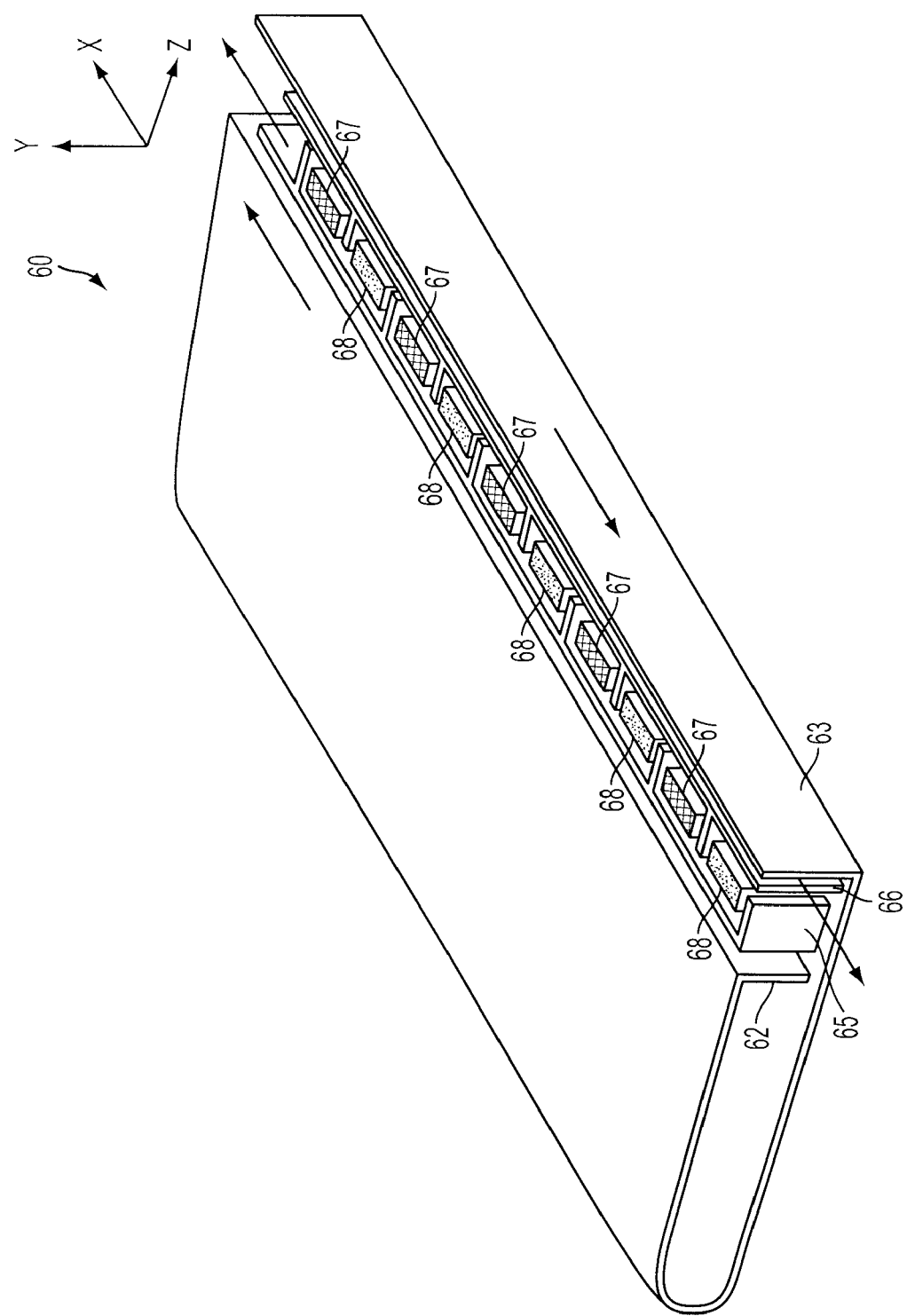
FIG. 8 illustrates an exemplary active twist airfoil system with a thermal expansion actuation system.

FIG. 8 illustrates the thermal actuation system of FIGS. 6A and 6B in an active twist beam system 60. A frame 65 is affixed to the trailing edge planar surface 62, and the opposite frame 66 is affixed to the trailing edge planar surface 63. Compression elements 68 and expansion elements 67 are arranged alternatingly between the protrusions of the frames 65 and 66, so that application of heat to the expansion elements causes the frame 65 and affixed airfoil trailing planar surface 62 to move in the positive x direction and the frame 66 and affixed airfoil trailing planar surface 63 to move in the negative x direction, causing a warping displacement (twist) in the airfoil shape.

As shown herein, the frames 65 and 66 of the warp actuator are affixed to the trailing edge planar surfaces 62 and 63. In other embodiments, no frames are needed, and the airfoil trailing edge planar surfaces are shaped with ridges or protrusions, with the expansion and compression elements being in direct contact with the airfoil structure.

Figure 9:
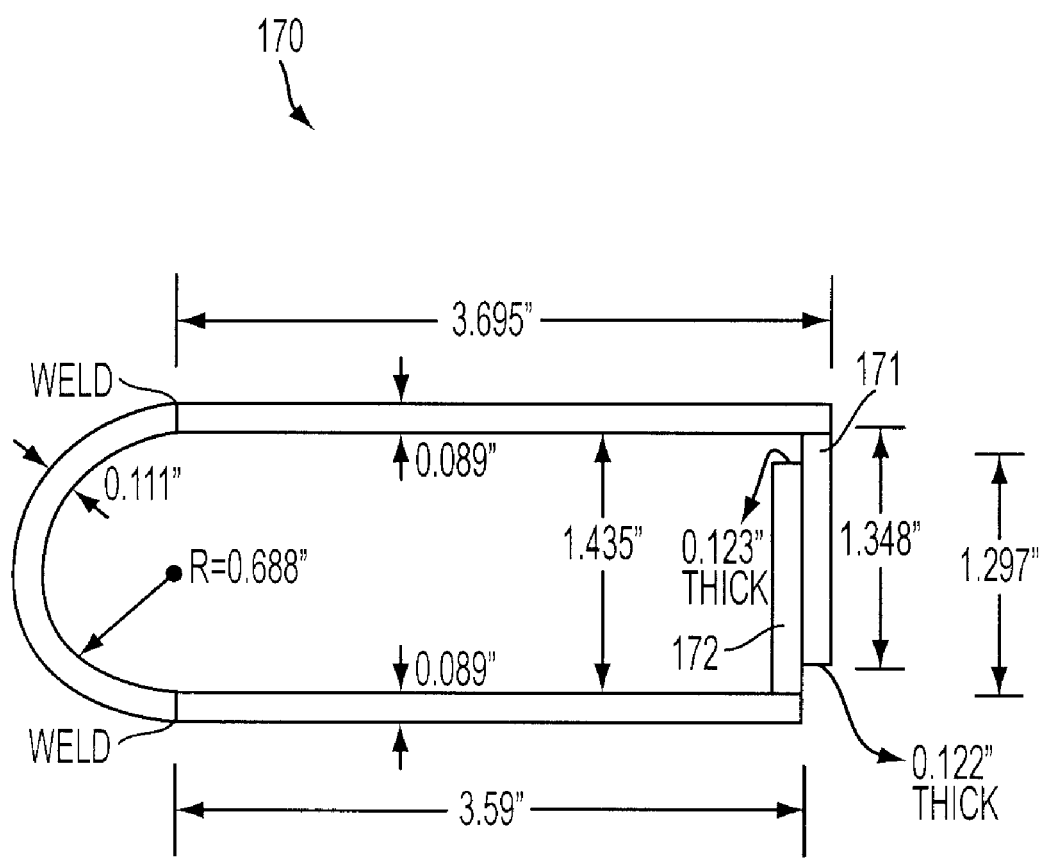
FIG. 9 illustrates a prototype open-beam split-trailing edge D-spar airfoil beam for demonstrating warp-twist behavior.

FIG. 9 illustrates a prototype D-spar beam 170 with a split trailing edge surface. The term D-spar is used to describe the shape of the cross section, although different cross section shapes are also suitable. The D-spar is a spar-beam for an airfoil section, capable of supporting all loads (e.g., aerodynamic, centrifugal, etc.) on the airfoil.

The FIG. 9 prototype beam 170 can be used to estimate the amount of warp resulting from linear displacement of opposing portions of the trailing edge structure. The prototype D-Spar is made of aluminum and sized to achieve a torsional stiffness, GJ, approximately equal to 20,000 N-m/(rad/m). Total length of the D-Spar beam is 34.5 inches. No warp actuator is installed for testing the D-spar, however, a linear bearing (not shown) is located in the vertical cut section between trailing edge sections 171 and 172 to restrict relative motion along the cut to span-wise warping. The trailing edge sections 171 and 172 are vertical spar walls at the trailing edge of the D-spar beam. Material tabs attached to the inner and outer sides of the vertical spar walls of the D-Spar extend from each end of the D-spar.

For the FIG. 9 beam, the $A_{BAR} \approx 0.5\pi(0.688)^2+(1.435)(3.59)=5.895$ in$^2$=38 cm$^2$, $L_P \approx 1.348+3.695+\pi(0.688)+3.59+1.297=12.091$ in=30.7 cm, and L=34.5 in=87.6 cm, and $t_{BAR} \approx 0.219(0.122)+0.603(0.089)+0.179(0.111)=0.1$ in=0.254 cm, where $t_{BAR}$ is a weighted average thickness term that accounts for the different thicknesses of the trailing edge sections and the rest of the D-spar beam.

Warping loads are applied by pulling the material tabs in opposing directions along the longitudinal axis of the D-spar. The D-Spar prototype is designed with a goal of an active twist capability of 0.032 rad/m.

An Instron mechanical load-frame and accompanying instrumentation is used to measure the mechanical response of the prototype D-spar. The warping surfaces of the D-spar are attached to a load frame through the extended material tabs. A tensile load is applied, and the crosshead displacement and rotation of the top and bottom of the beam are measured. The Instron load frame has a 1000 lb load cell for measuring the applied warping force. The top D-Spar warp-tab is pinned to the load-frame through a chain and clevis attachment to allow for rotation. The bottom warp-tab is pinned to the load-frame through a rigid clevis attachment. The test is conducted under crosshead displacement control at an extension rate of 0.002 in/min. The test is interrupted every 0.005 inch of extension for approximately 30 sec to allow for beam rotation measurements. A total of ten load-rotation measurements are taken over a total warping displacement of 0.050 in.

Laser pointers are mounted on the top and bottom of the beam lying in the cross-section plane. Each laser pointer is projected to a measurement ruler (millimeter decrements) mounted approximately 7.5 ft away, and relative displacement between the top and bottom is used to calculate the beam twist, φ, where Δ is the distance (mm) between the current and starting laser projection locations on the ruler, and d is the distance from the center of rotation of the beam to the ruler. In this demonstration, d for the top part is 2413 mm and d for the bottom part is 2286 mm). The beam twist is $\phi=\tan^{-1}(\Delta/d)$. Total beam twist is the sum of the top and bottom beam twists.

Figure 10A:
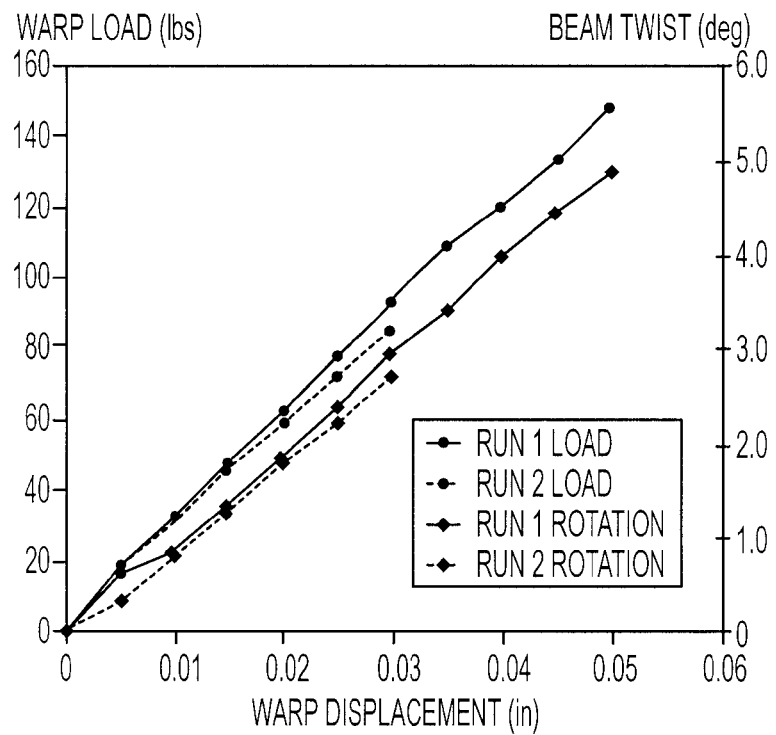
FIGS. 10A and 10B illustrate experimental results for the D-spar airfoil beam of FIG. 9.
Figure 10B:
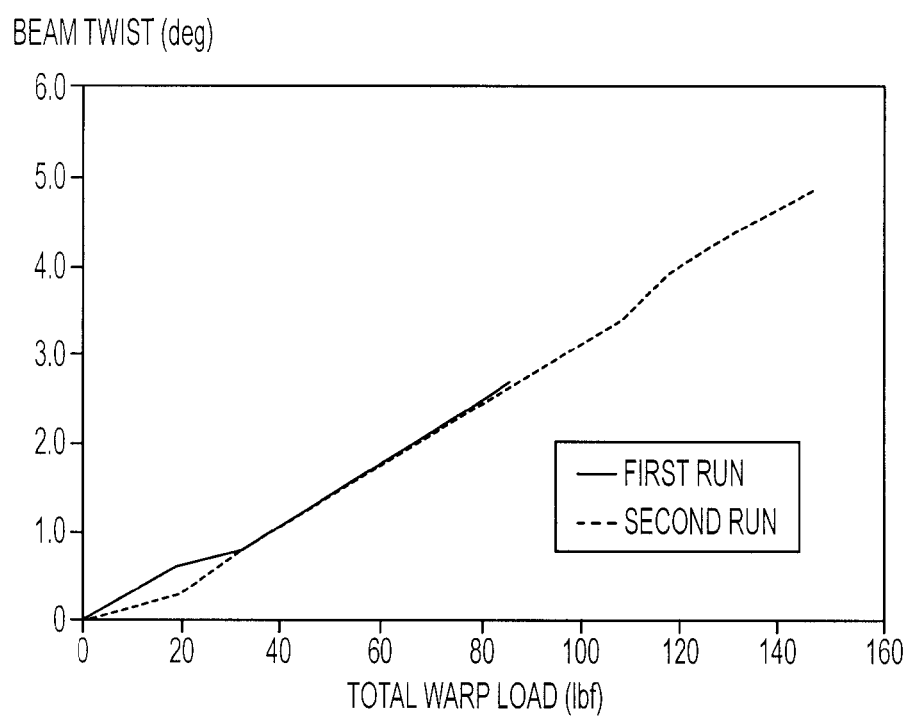

As seen in FIG. 10A and FIG. 10B, the prototype D-Spar exhibits approximately 0.05 in of warping displacement and 5.0 deg of beam twist when 150 lbs warping load is applied. These numbers result in a measured warping stiffness, $k_{warp}$ of 3000 lbf/in (525 N/mm) and warp-rotation ratio, $k_{w-r}$ of 0.01 in/deg (14.6 mm/rad). These two stiffness quantities are related to the beam geometry and materials through equations (8) and (9), in which the warping force is q×L, and the beam twist is θ×L, where L is the length of the beam.

$$k_{warp} = \frac{q \times L}{w} = \frac{GL_p t^3}{12 A_{BAR}^2} \times L \quad \text{Equation (8)}$$

$$k_{w-r} = \frac{w}{\theta \times L} = \frac{2 A_{BAR}}{L} \quad \text{Equation (9)}$$

Equations (8) and (9) produce a warping stiffness $k_{warp}$ of 687 N/mm and a warp-rotation ratio $k_{w-r}$ of 8.7 mm/rad, for the FIG. 9 D-spar formed from 7075-T6 aluminum. The calculated value of warping stiffness $k_{warp}$ is 31% higher and the calculated value of $k_{w-r}$ is 41% lower than the experimentally determined values. Several factors may contribute to the discrepancies between the measured stiffness and the predicted stiffness. First, the application of warping loads through the external tabs at each end of the beam is non-ideal. The tabs are not coaxial, which produces a bending moment that tends to separate the tabs in the chord direction. This tab separation motion will be added to the warp displacement measured by the test machine creating an apparent increase in the warp displacement per unit rotation, as observed (i.e., 14.6-vs-8.7 mm/rad). It also creates an apparent increase in the warp displacement per unit load, or an apparent decrease in the observed warping stiffness (i.e., 525-vs-687 N/mm). Another possible factor is the rotational constraint imposed by the mechanical connection between the D-Spar loading tabs and the load frame. The presence of a resisting torque will decrease the rotation for a given warp displacement or conversely, increase the warp displacement for a given rotation (i.e., 14.6 vs. 8.7 mm/rad). These factors are likely contributors to the disagreement between calculations and experimental data.

Figure 11A:
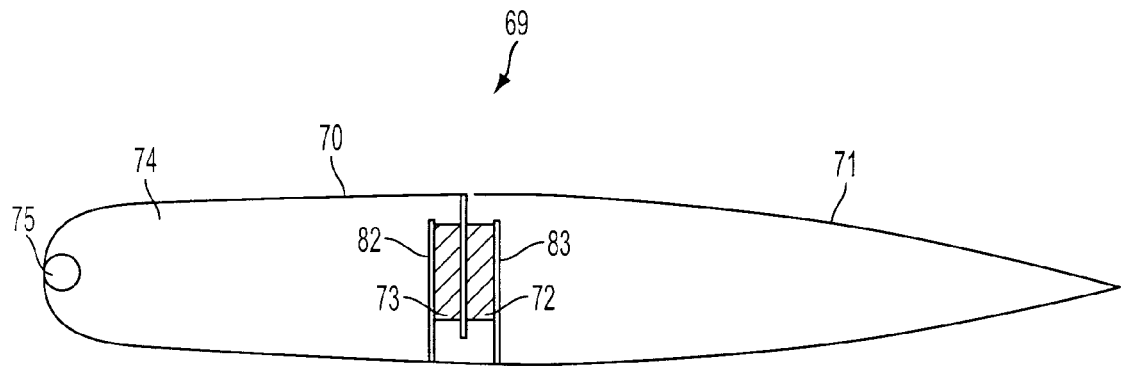
FIGS. 11A, 11B, and 11C illustrate an exemplary active twist hollow beam system with a thermal expansion actuation system.
Figure 11B:
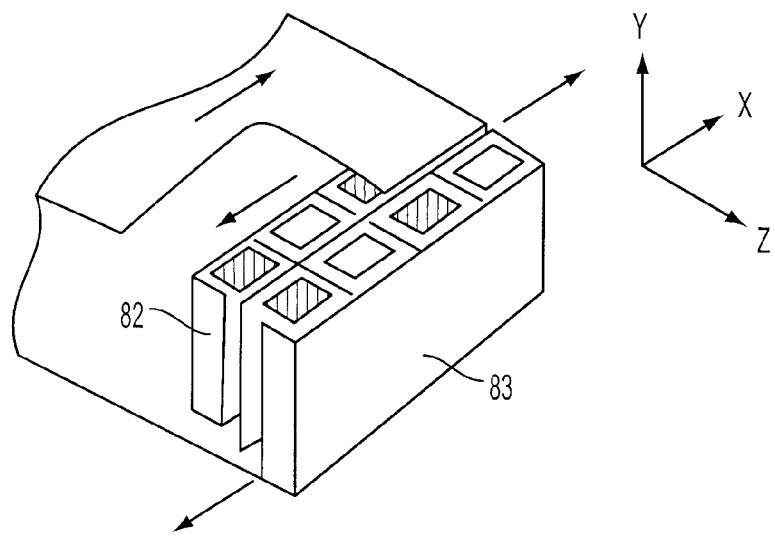
Figure 11C:
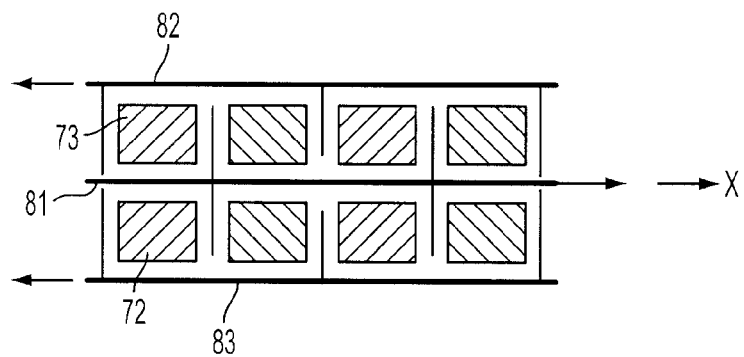

FIGS. 11A, 11B, and 11C illustrate an active twist airfoil system 69 with integrated shear actuator in accordance with an embodiment of the invention. Two degrees of twist are achieved by an approximately 1 m long prototype with the application of a warping load of 210 N distributed uniformly along the span.

FIG. 11A is a cross sectional view of the airfoil, with a fairing section 71 positioned aft of the warp actuators 72 and 73 to minimize drag. The hollow portion of the airfoil can be filled with foam 74 or another lightweight material. A balance weight 75 can be located close to the leading edge of the airfoil.

FIG. 11B is a cutaway view of the airfoil 69, showing the two warp actuators as including alternating thermal expansion elements and compression elements arranged to push the central planar section 81 in the positive x direction, and to push the two surrounding planar sections 82 and 83 in the negative x direction, warping the airfoil 69.

FIG. 11C is a cross sectional view of the airfoil with the warp actuators 72 and 73 in place.

The size of the thermal shear actuators in can be determined using Equations (7) and (1) for warping. The beam provides an elastic warping resistance q to the actuator according to the following Equation (10):

$$q = -\frac{GL_p t^3}{12 A_{BAR}^2} w = -kw \quad \text{Equation (10)}$$

The following equation for the actuator warping displacement as a function of temperature change for the thermal expansion material can be used to make design choices for the hollow beam D-spar system.

$$w = \frac{\left[\frac{\alpha L_1 L_2}{L_1 + L_2}\right]}{1 + \left[\frac{L_1 L_2}{AE}\right]\left(\frac{GL_p t^3}{12 A_{BAR}^2}\right)_{D-Spar}} \times \Delta T_1 \quad \text{Equation (11)}$$

The following example illustrates how to size an actuator for a given length of a beam. A desired 1.8 degree/meter rotation θ in the beam corresponds to a warping displacement w of 0.33 mm, according to Equation (1). Equation (11) leads to an expression involving the properties α, E, $L_1$, $L_2$, A, $\Delta T_1$ of the thermal actuator and the D-spar variables.

The material to be used for the thermal expansion elements and compression elements is selected from FIG. 7. The thermal expansion coefficient and elastic modulus E for the selected material are found from FIG. 7. As can be seen from FIG. 7, polyethylene has a high thermal expansion coefficient compared to many other materials, and requires reasonably small temperature differentials (ΔT) to achieve high warping displacement.

Equation (11) predicts the temperature difference that would be required to achieve approximately 0.3 mm of warping displacement w corresponding to the 0.032 rad/m rotation θ desired for the system. For a low or medium density polyethylene, the 0.3 mm of warping displacement can be achieved with a temperature differential that is well within the temperature operating range for polyethylene (approximately 45 degrees C.).

The following example illustrates shows design calculations for a thermally actuated D-spar, with representative results for a low/medium density polyethylene (PE).

For this example, the following D-spar parameters are used: $L_P$=30.83 cm; t=0.26 cm; $A_{BAR}$=47.29 cm²; G=2.7 GPa. The thermal actuator geometric parameters are: $L_1$=5 cm; $D_1$=2 cm; $A_1$=3.14 cm²; $L_2$=5 cm; $D_2$=2 cm; $A_2$=3.14 cm². The thermal actuator material properties are: low/medium density polyethylene, linear copolymer; $E_1$=0.4 GPa; $\alpha_1$=300 μm/m/deg C.; $E_2$=0.4 GPa; Tmax=85 deg C.

Warping for different temperature differentials in the thermal expansion material is calculated using the equation w=$C_1$(1+$C_2$k)$^{-1}$ΔT, where $C_1$=$\alpha_1 L_1 L_2/(L_1+L_2)$ and k=$GL_P t^3/12A_{BAR}^2$.

$C_1$=7.5 μm/deg C.
$C_2$=1.989 μm/(N/m)
k=5.187×10⁵ m(N/m)
Actuator stiffness 1/$C_2$=50.27 MPa Using these parameters, the warping displacement for different thermal differentials is calculated using the equation w=$C_1$(1+$C_2$k)$^{-1}$ΔT as:

| ΔT (deg C.) | w (mm) |
| --- | --- |
| 100 | 0.7423 |
| 95 | 0.7052 |
| 90 | 0.6681 |
| 85 | 0.6310 |
| 80 | 0.5939 |
| 75 | 0.5568 |
| 70 | 0.5196 |
| 65 | 0.4825 |
| 60 | 0.4454 |
| 55 | 0.4083 |
| 50 | 0.3712 |
| 50 | 0.3712 |
| 45 | 0.3341 |
| 40 | 0.2969 |
| 35 | 0.2598 |
| 30 | 0.2227 |
| 25 | 0.1856 |
| 20 | 0.1485 |
| 15 | 0.1114 |
| 10 | 0.0742 |
| 5 | 0.0371 |
| 0 | 0.0000 |

Thus, a 0.3 mm warping displacement with an approximate 40 deg C. temperature differential can be achieved with polyethylene (PE) as the thermal actuator material for this particular actuator and D-Spar. As can be seen in FIG. 7, polyethylene has a very high coefficient of thermal expansion relative to most other materials, although other materials with high coefficients of thermal expansion are also suitable.

The shear-warp actuators can be continuous along the beam span, with a single controller, so the entire beam experiences the same amount of twist per unit length.

Embodiments of the invention are also directed to hollow beams which include several independently controlled shear-warp actuators. These separate, independently controlled, shear-warp actuators can be arranged at different locations along the longitudinal span of the beam, to achieve localized control of the beam twisting. For example, FIG. 12 illustrates a beam with three segments 91, 92, and 93 extending in the longitudinal or spanwise x direction, each of which can be separately controlled with shear-warp actuators 94, 95, and 96. The shear-warp actuators can induce different warp displacements and different amounts of twist in the beam segments 91, 92, and 93 along the span.

Figure 13:
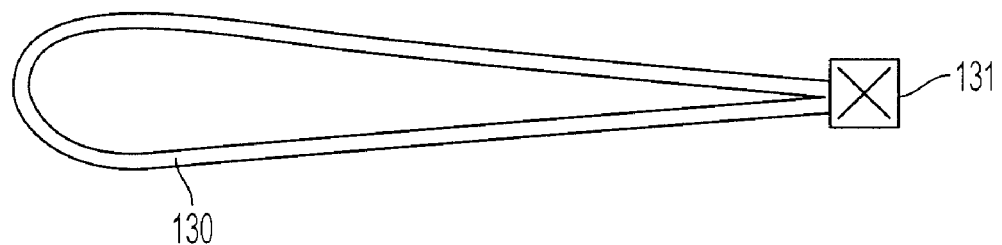
FIGS. 13 and 14 illustrate some different embodiments of single and double-section active twist beam systems.
Figure 14:
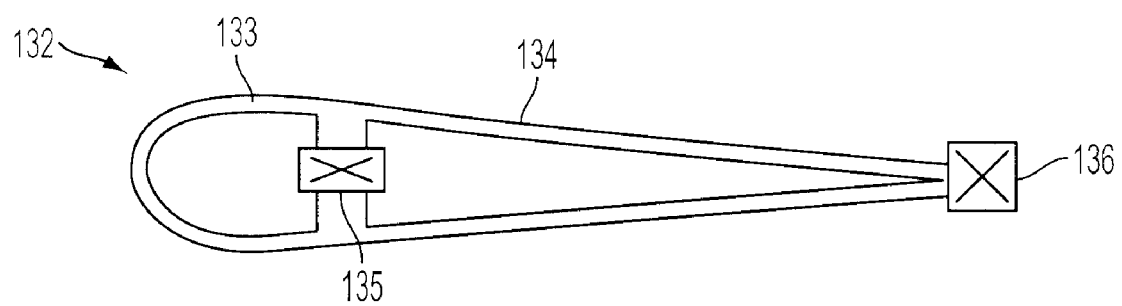

FIGS. 13 and 14 show some different embodiments of active twist beam systems. For example, FIG. 13 illustrates a single section beam 130 with a shear-warp actuator 131 arranged at the trailing edge of the airfoil-shaped beam. FIG. 14 illustrates an airfoil-shaped beam 132 with a shear-warp actuator 135 arranged at an intersection between a forward section 133 and an aft section 134 that induces warp in both the forward section and the aft section of the beam and a second shear-warp actuator 36 arranged at the trailing edge. Note that only one actuator is needed (either 135 or 136) to affect twist in the two-section hollow beam. The same applies to hollow beams with more than two sections.

Other type of actuation elements can be used in-place of the thermal expansion elements. Examples of suitable actuator types include but are not limited to hydraulic, pneumatic, magnetostrictive, and piezoelectric actuators.

Figure 15A:
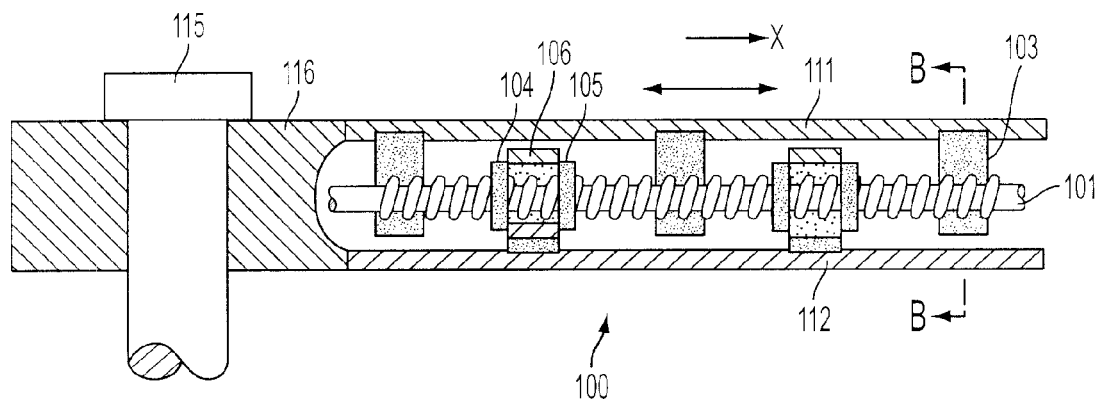
FIGS. 15A and 15B illustrate a screw-based shear-warp actuator for inducing warp displacement in hollow beam with a split along its longitudinal extent.
Figure 15B:
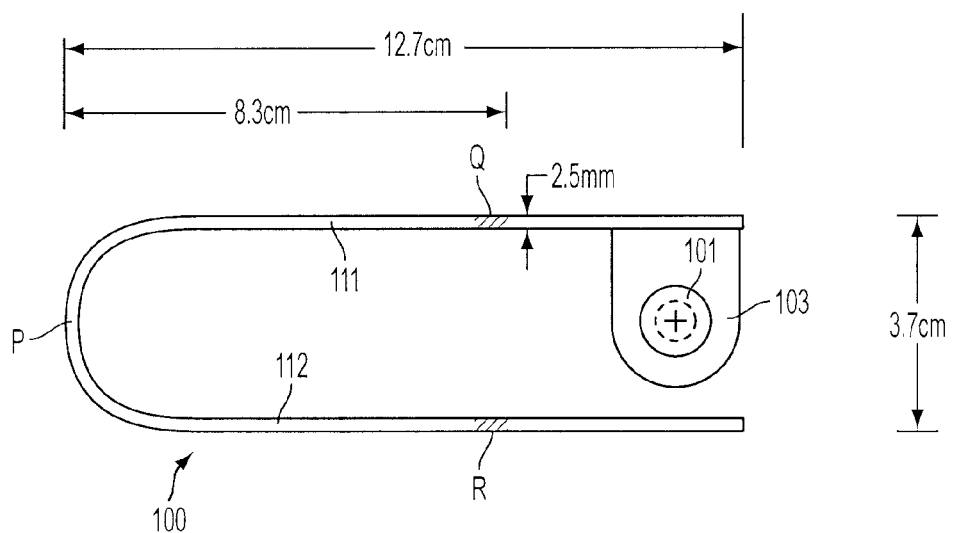

FIGS. 15A and 15B illustrate a screw-based shear-warp actuator for inducing warping displacement in hollow beam with a split along its longitudinal extent. FIG. 15A is a cross sectional view, and FIG. 15B is an end view of the screw-driven active twist system. The system is a part of a larger rotor blade system, with a rotor shaft 115 supporting the hub and attached rotor blade 100.

Rotation of the threaded screw 101 moves the upper beam section 111 in a longitudinal direction along the longitudinal length of the beam with respect to the lower beam section 112, causing the beam to twist.

The threaded screw 101 is axially fixed to the lower beam planar surface 112 with collars or pillow blocks 106 sandwiched between pairs of stays or lock collars 104 and 105. The threaded screw 101 also extends through the interior threads of the interior threaded nuts or collars 103, so as the threaded screw 101 rotates, the interior threaded collars 103 are pushed in the positive or negative x direction. The interior threaded collars 103 are fixed to the upper beam section 111, and thus, force linear translation of the upper beam section 111 in the positive or negative x direction with respect to the lower beam section 112, inducing a warp and consequent twist in the beam 100.

The three points of zero warping are shown as points P, Q, and R. The dimensional information and points-of-zero-warping correspond to the fabricated aluminum D-Spar prototype discussed above. The diameter of the threaded screw 101 can be sized to provide the necessary overall torsional stiffness in the beam, for example, to recover the closed section torsional stiffness of the beam.

It is not necessary that the threaded screw 101 be threaded for its entire length. Exterior threads are necessary only where the screw surface engages the threaded collars 103. The remaining portion of the screw can be free of threads.

The threaded collars 103 are chemically or mechanically affixed to the upper beam surface 111, so spanwise motion of the collars warps upper beam surface in a spanwise direction relative to the lower beam surface 112. Alternatively, the threaded collars can be integrally formed with the beam.

It is also envisioned that the system could use another rotary mechanism instead of the threaded screw 101, as long as the rotary device extended longitudinally along the split portion of the beam and engaged mating surfaces at several locations along the span of the beam.

As one example, helical cams with connecting rods arranged between the helical cams can be used to induce twist in the beam. Rotating one end of a connecting rod turns the helical cams, inducing twist in the beam. As another example, moment arms with connecting rods arranged between the moment arms can be used to induce twist in the beam. Rotating one end of a connecting rod turns the moment arms, which are engaged with a mechanism attached to one of the beam's planar surfaces, inducing the twist in the beam.

The active twist beam system and methods described herein can be applied to any hollow beam with a longitudinal split that allows relative longitudinal motion between the split surfaces of the beam, and in particular to hollow beams with a longitudinal section cut-out from the beam with a shear actuator attached and acting between the two cut edges. The cross-sectional shape of the beam can be varied, and the location of the longitudinal cut or slit in the beam cross-section can be varied.

The term hollow, as used herein, refers to beams with walls that are thin, where the wall thickness is less than the other beam dimensions such as height, width, and length. The hollow beam can have core materials inside the hollow recesses, and can include thicker and/or stronger areas which may be desirable near the stress points of the beam. The beam can be monocoque or semi-monocoque.

Figure 16A:
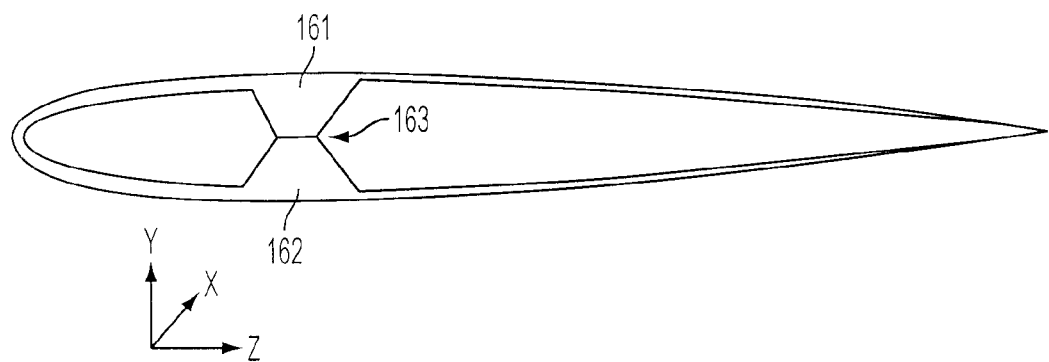
FIGS. 16A and 16B show a NACA-0012 airfoil beam used for finite element analysis.
Figure 16B:
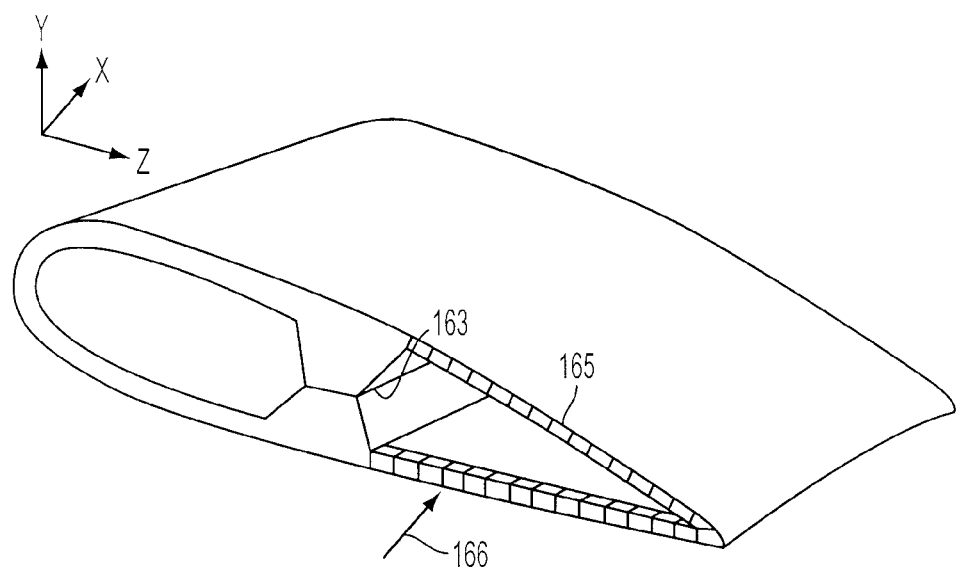

Finite element analysis of a cantilevered two-cell airfoil blade was conducted on a NACA 0012 airfoil with an 8 inch (20.3 cm) chord and 8 foot (2.44 m) span. The airfoil was made of 7075-T6 aluminum with the fairing skin thickness equal to 0.010 inch (0.25 mm) and the front spar wall thickness equal to 0.100 inch (2.5 mm). A horizontal cut 163 was introduced in the vertical spar section 161 and 162, as illustrated in FIG. 16A. FIG. 16B illustrates the "rib" stiffening applied at the airfoil tip using one row of rigid elements in the fairing section. A row of rigid elements is employed at the outboard tip of the airfoil in the fairing portion of the blade. The cut 163 forms sliding surfaces between the vertical spar sections 161 and 162, with the sections 161 and 162 constrained to slide relative to each other only in the x direction shown.

ABAQUS/Standard finite element code was used for the analysis. An elastic, finite-strain formulation was used with 20-node hex (quadratic) elements. Joining the two sides of the spanwise cut in the spar are ABAQUS slot-type connector elements (CONN3D2), which constrains relative motion across the cut to warping displacements only (displacements along deformed x-axis, as illustrated in FIG. 16). The NACA 0012 geometry was meshed with Cubit, and there were approximately 1.7 million nodes and 300,000 elements used in the analyses. The simulations were performed on an SGI Origin 3900 and SGI Altix 4700 with 4 active CPUs and 12 GB memory. Runtime was approximately 4 hours/simulation.

Two cases were analyzed. In both cases, the airfoil was rigidly attached (cantilevered) at the root. In Case I, a linear increasing warp displacement was imposed, from zero to ±100 μm at the tip. In Case II, a 50 N-m twisting couple was imposed at the tip through opposing tangential forces applied at the centerline of the vertical spar (2.25 inches (5.7 cm) aft of the leading edge) on the outside surfaces of the airfoil. The results of the analysis are provided below.

Figure 17A:
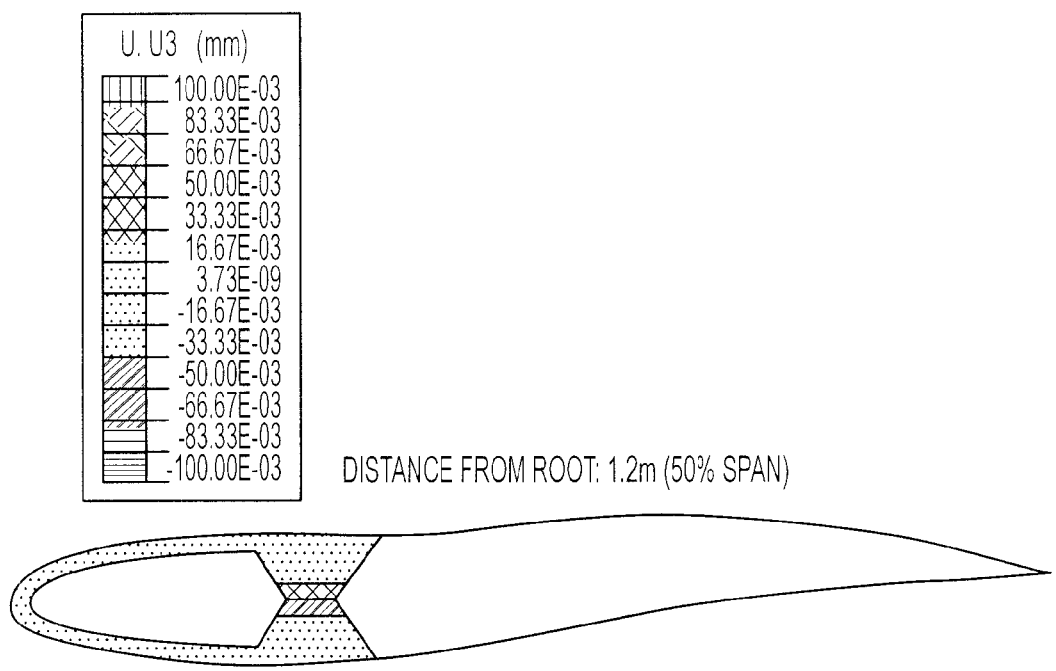
FIGS. 17A and 17B show the results of an applied warping displacement analysis at the midspan and tip of the airfoil beam.
Figure 17B:
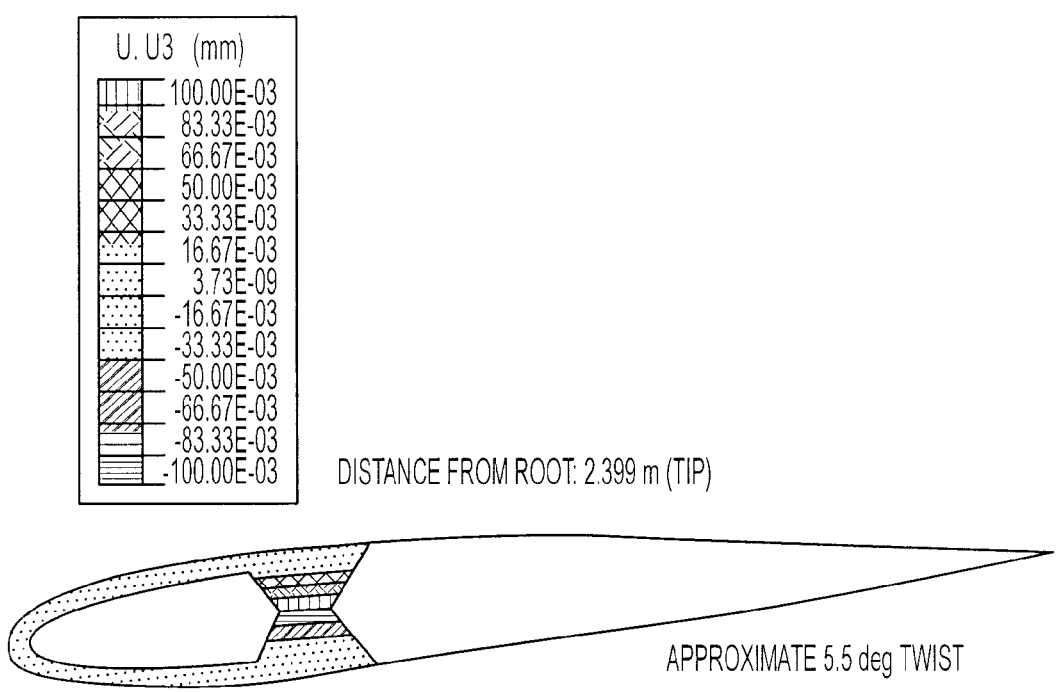

FIGS. 17A and 17B and FIGS. 18A and 18B show of the results from the Case I (applied warping displacement) analysis. A warp of zero is applied at the root and ±100 μm at the tip on the upper and lower surfaces across the cut. FIG. 17A shows results for warping displacement versus twist at the 50% span positions (1.12 m from the root). FIG. 17B shows results for warping displacement versus twist at the 100% span position (at tip, 2.299 m from root). As expected, the warping of the sliding surfaces is larger at the tip of the airfoil than at the midspan. As seen in FIG. 17A, some chordwise bending is observed at the midspan of the the airfoil section. This would be eliminated in an actual blade through the use of structural ribs in the airfoil section. Total blade twist at the tip for the imposed warping displacement was 5.5 deg.

Figure 18A:
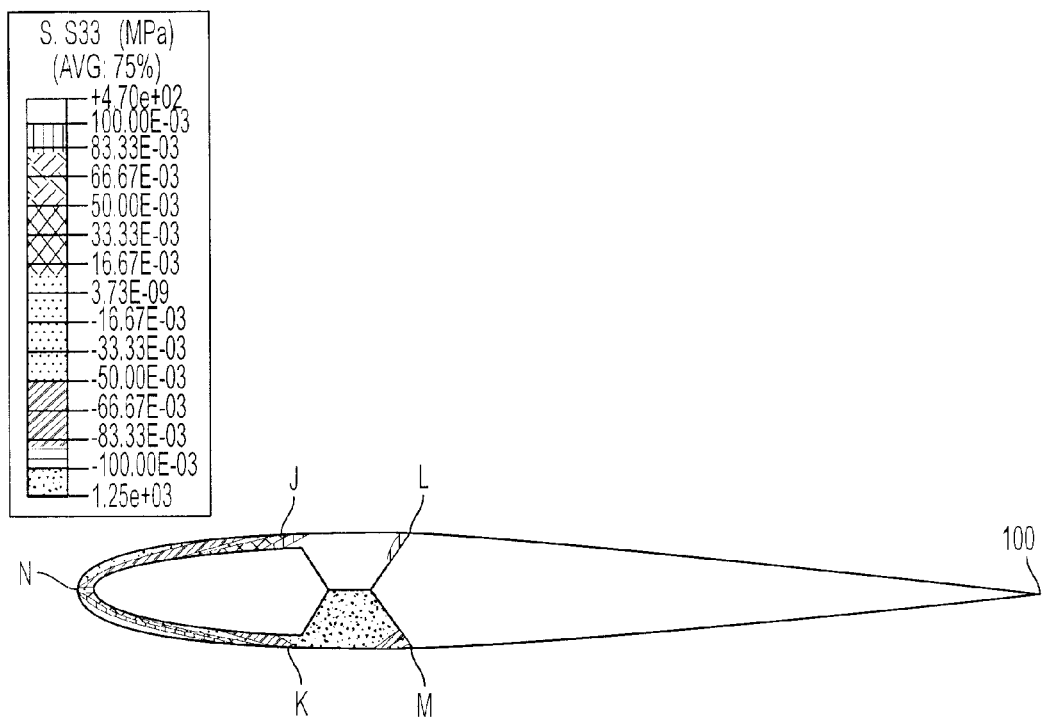
FIGS. 18A and 18B show the zero warping points on the airfoil beam.
Figure 18B:
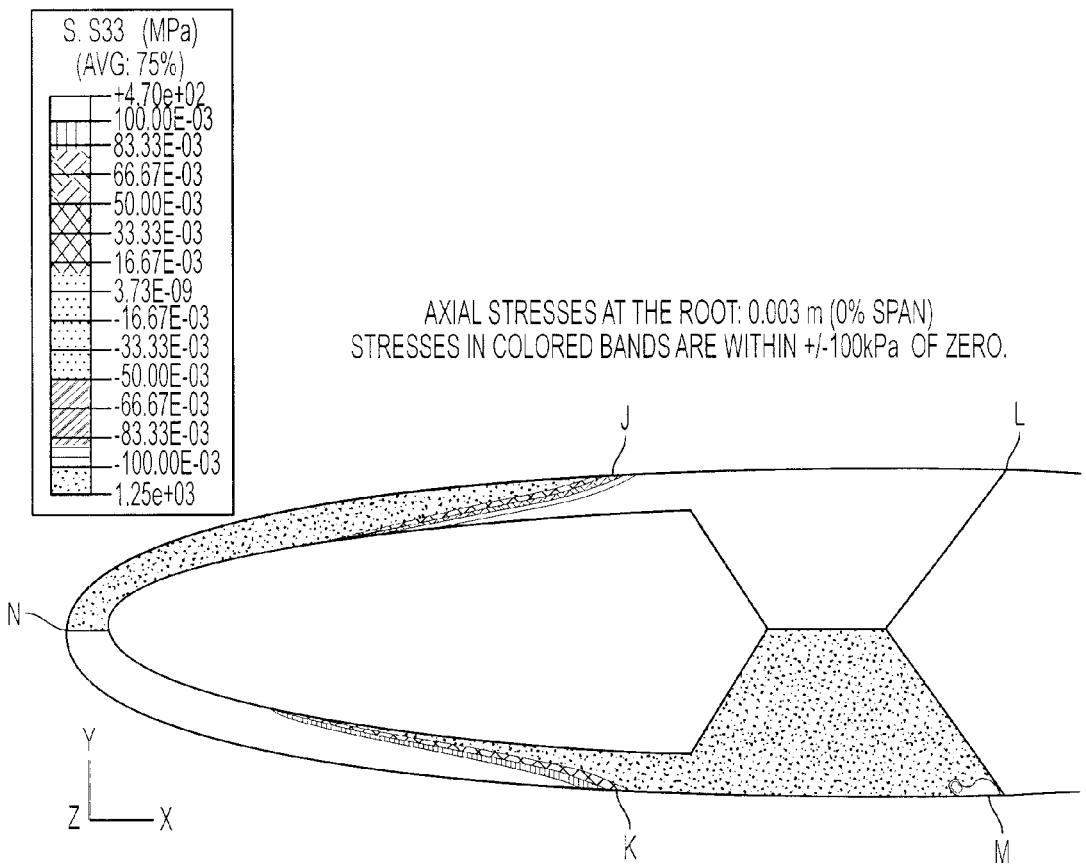

FIGS. 18A and 18B show the axial stresses at the root of the airfoil (at a point 0.003 meters, or about 0% along the airfoil span). The stresses indicated by the changes between dark and light shading represent transitions from positive to negative stress (passing through zero). Within the shaded transition areas, the stresses are within plus or minus 100 kPa. The results show that there are actually six locations on the cross-section at the root that would experience zero warping deformation if the cross-section was not constrained at the root (one each at the leading edge and tail, and two each on the upper and lower surfaces due to horizontal symmetry, indicated by letters I, J, K, L, M, and N.

Figure 19A:
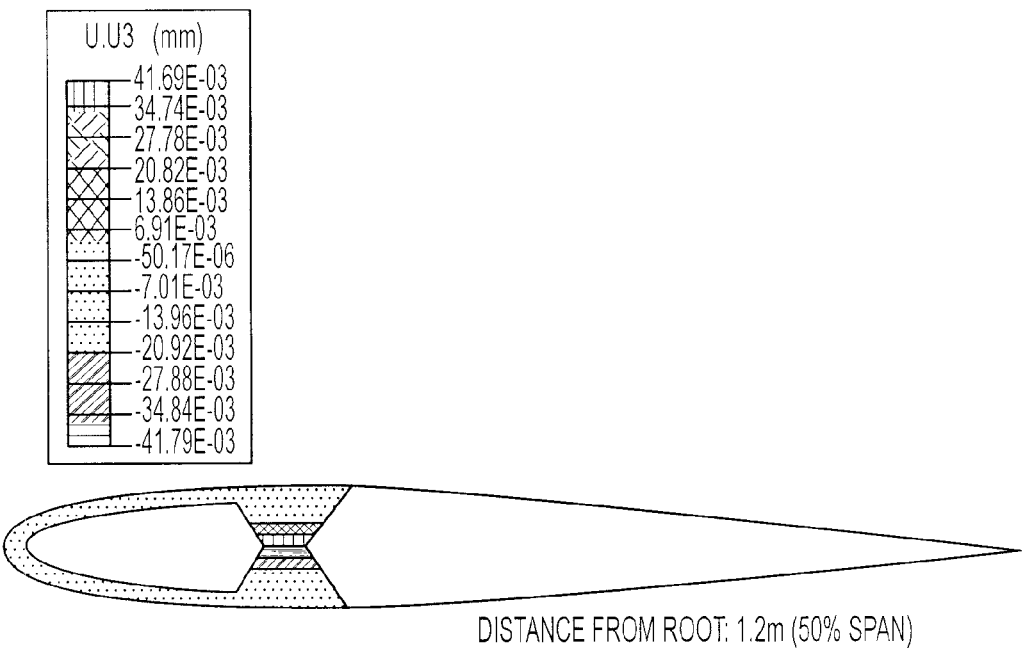
FIGS. 19A and 19B show of the results from the applied torsion couple analysis at the midpoint and tip of the airfoil beam of FIG. 16A-16B.
Figure 19B:
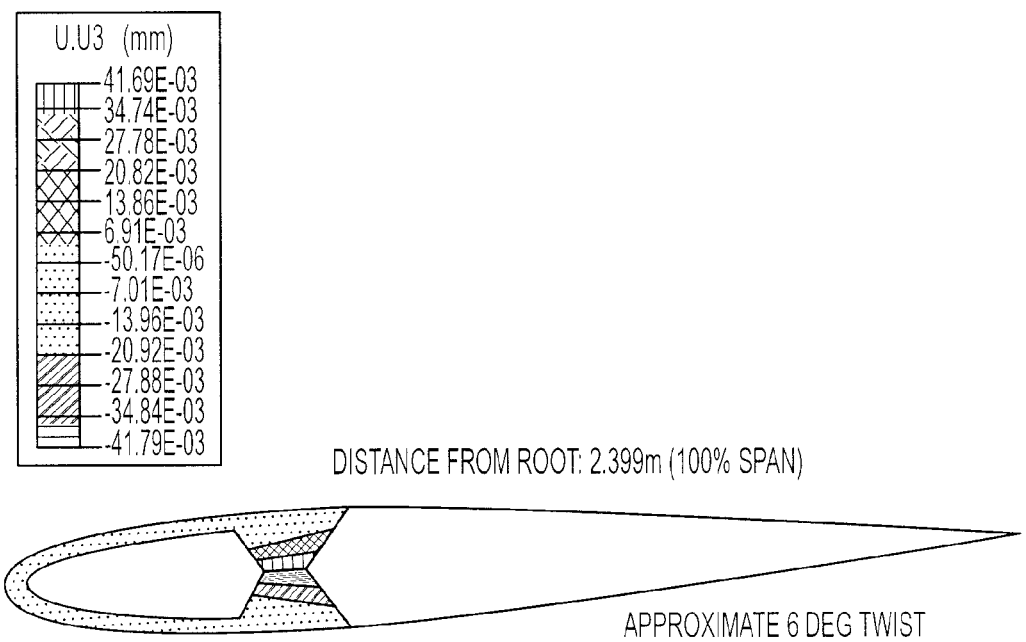

FIGS. 19A and 19B show of the results from the Case II (50 N-m applied torsion couple) analysis, as warping displacement versus twist at the 50 and 100% span positions, respectively. Little or no chordwise bending was observed this particular case. Total blade twist at the tip for the imposed twist couple of was 6 degrees, which is slightly more that that experienced in Case I.

Figure 20:
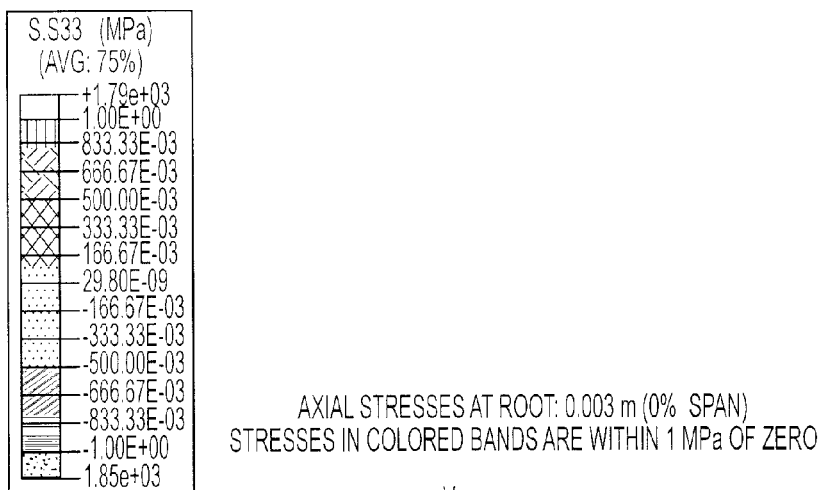
FIG. 20 shows the axial stresses at the root of the airfoil beam for the applied torsion couple analysis.

FIG. 20 shows the axial stresses at the root for Case II, in which the stresses indicated by the changes between light and dark shading represent transition from positive to negative stress (passing through zero). The results are similar here, too, in that there are six locations on the cross-section at the root that experience zero warping deformations: one each at the leading edge and tail, and two each on the upper and lower surfaces symmetrically located (points S, T, U, V, W, and X).

Figure 21:
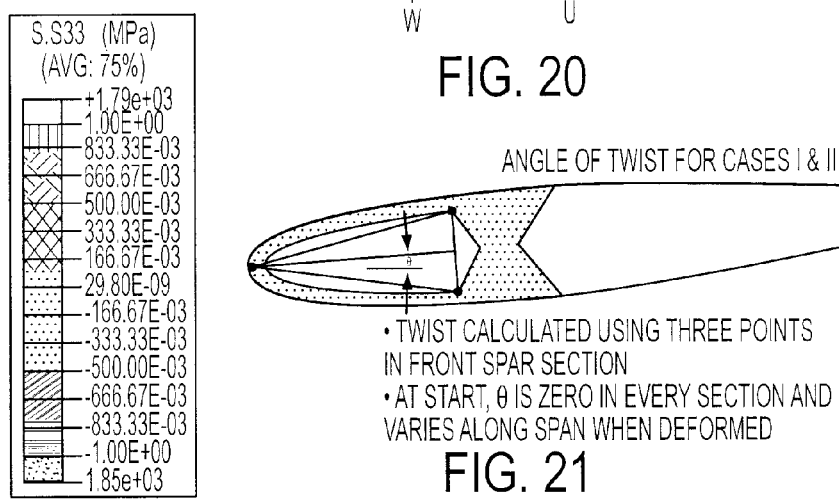
FIG. 21 shows how the twist angle θ is measured from the chord of the airfoil.
Figure 22:
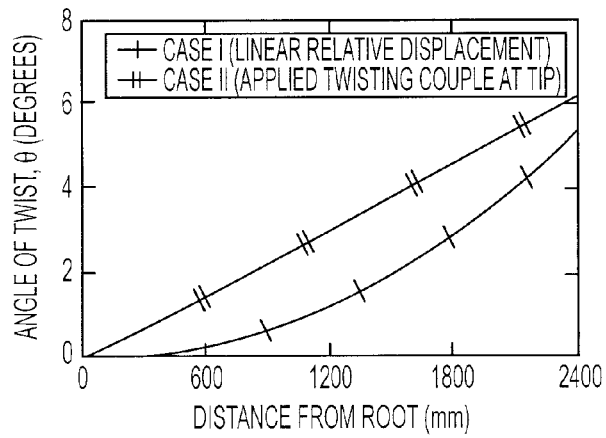
FIG. 22 plots the spanwise distribution of twist for case I, the applied warping analysis case, and case II, the applied torsion couple analysis case.

FIGS. 21-23 provide a comparison of blade twist between the two different loading cases. FIG. 21 shows how the twist angle θ is measured from the chord. The twist is calculated using three points in the front spar section. At the start, the twist angle is zero in every section, and then varies along the span when the airfoil is deformed.

As seen in FIG. 22, the spanwise distribution of twist varies linearly in Case II and non-linearly in Case I. Twist at the tip is nearly identical. Case I represents the concept of applying a warping deformation that increases linearly from root to tip to induce twist.

Figure 23A:
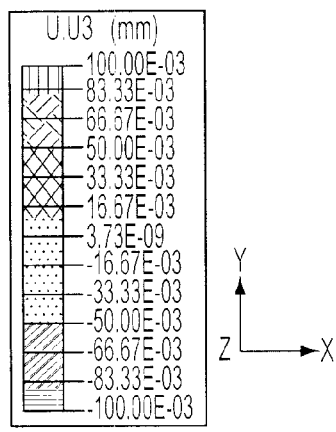
FIG. 23A-23D show the warping displacements in the applied warping case and the applied torsion case at midspan and tip of the blade.
Figure 23A:
Figure 23B:
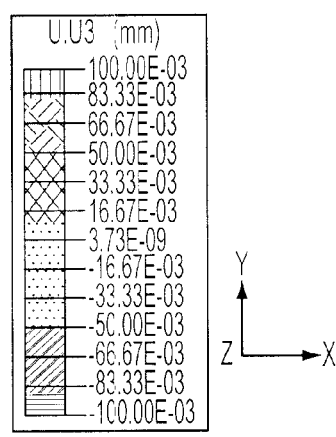
Figure 23B:
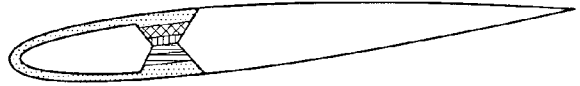
Figure 23C:
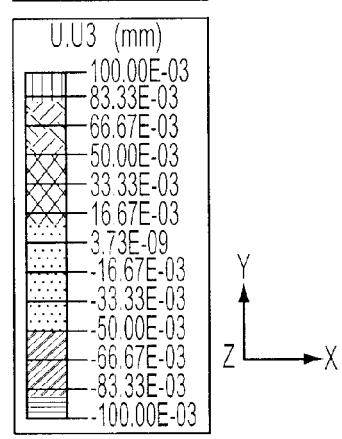
Figure 23C:
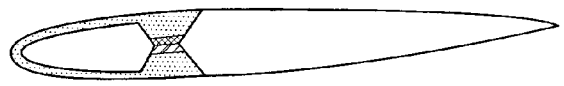
Figure 23D:
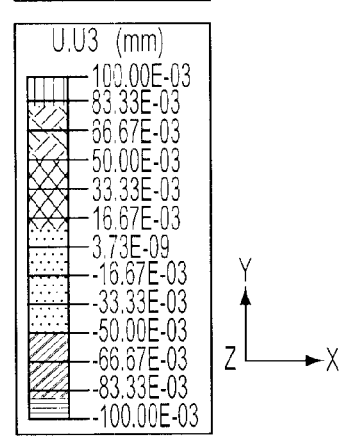
Figure 23D:
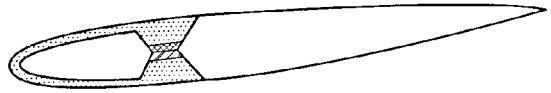

FIG. 23A-23D compare the warping displacements in the Case I and Case II on the same scale, and illustrates that the warping displacement in Case II at the tip is expected to be ~50% of that in Case I for the same approximate degree of tip twist. FIG. 23A illustrates Case I (applied linear warp displacement) at midspan. FIG. 23B shows the Case I results at the tip of the blade. FIG. 23C illustrates Case II (applied end torque) warping displacements at midspan. FIG. 23B shows the Case II results at the tip of the blade. The linear warping induces chordwise bending deformations of the airfoil. Case I has higher warping displacements at the midspan and tip than Case II, with the highest warping displacement at the Case I tip, as expected.

These finite element results provide additional confirmation that spanwise warping displacement and blade twist are equivalent. Warping displacements produce twist and twist produces warping displacements. In the current configuration, linear warping from zero to 0.2 mm at the tip produced 5.5 deg of twist. For this two-section airfoil, there are six locations on the cross-section at the root that experience zero warping (FIGS. 18A, 18B, and 20). Structural connections at these points can be used to minimize warping constraint and the actuation force needed to affect twist. The concept of using warping to induce twist has been validated by this analysis, even with the blade fully anchored at the root (Case I results). The unusual airfoil deformations observed can be mitigated using structural rib stiffeners as needed in the airfoil section.

The following table lists some characteristics of some other active-twist system designs.

In contrast, the novel active twist system and method described herein takes advantage of the significantly lower energy associated with elastic twist of open-section beams. This permits the use of lower actuator loads/power to achieve the same degree or greater twist with the potential for actuator volume and weight savings and the potential for simple design and easier fabrication of the active twist airfoil systems, including systems such as helicopter rotor blades and aircraft airfoils such as wings and control surfaces.

This system provides the ability to actively control the rotational twist of a hollow airfoil beam along its longitudinal axis, and requires significantly smaller forces to actuate the twist than other methods and can be used to enhance the aerodynamic performance over various operational regimes. Active control of airfoil twist corresponds to localized changes in angle-of-attack, which can have a large influence on the lift and drag forces. Applications include: improving helicopter rotor performance in hover and forward-flight, improving fixed-wing efficiency through reduced aerodynamic drag, improvements in air vehicle flight controls and water vehicle (surface and underwater) navigation controls through device design/construction simplification and downsizing, turbine performance improvement through twist control of the fixed turbine stator blades, and new types of twisting robotic "appendages" that are simpler in design and construction and lighter in weight.

The invention has been described with reference to certain preferred embodiments. It will be understood, however, that the invention is not limited to the preferred embodiments discussed above, and that modification and variations are possible within the scope of the appended claims.

What is claimed as new and desired to be protected by Letters Patent of the United States is:

1. An active twist hollow beam system comprising:
   a hollow beam, the beam being split along a longitudinal length of the beam; and

| Concept | Team | Maximum Blade Twist Achieved | Notes |
|---|---|---|---|
| Embedded PZT wafers in spar | Chopra et al. (UMD) | 0.4 deg @ 50 Hz 1.1 deg @ 90 Hz | Integral w/spar; vibration control |
| Active PZT fiber composites (AFC) | Wilbur et al. (NASA/Army/MIT) | 2 deg @ 1 Hz 1.5 deg @ 68 Hz | Integral w/spar; vibration control |
| Smart active blade tip (SABT) | Chopra et al. (UMD) | 2-2.5 deg @ 930 RPM | Flap at blade tip; vibration control |
| Active materials rotor; integral & flap designs | Derham et al. (Boeing/MIT) | 0.6-1.4 deg @ hover speed | Integral w/spar and blade flap; vibration control |
| Shape Memory Actuator Rotary Actuator | Jacot et al. (Boeing) | 8 deg at <1 Hz | Actuator, torque tube, lock; hover performance |

Some previously developed methods for active twist control rely on torsionally deforming closed-sections beam section through actuators embedded in the cross-section or by a coaxial torque actuator attached between the outboard tip and beam root section. The large torsional rigidity of these closed cross-sections requires large actuation forces to achieve a given degree of twist. Some of the active-twist designs with structure-embedded actuation are limited to a few degrees of twist or less over the length of the blade. The twisting of closed-section beams by embedded or other types of actuators requires large amounts of actuation energy because of the large amount of elastic strain energy associated with the twisting of a closed-section beam.

an actuator arranged to move a first split surface and a second split surface of the beam in a longitudinal direction relative to each other along the longitudinal length of the beam, inducing a twist in the beam, each of said split surfaces having a plurality of protrusions spaced apart along the longitudinal direction, the actuator comprising a plurality of solid thermal expansion blocks, each of the solid thermal expansion blocks comprising elastomer or polymer, the actuator further including a plurality of mechanical compression blocks arranged in an alternating pattern with the solid thermal expansion blocks, wherein, of the mechanical compression blocks and the solid thermal expansion blocks, only the solid thermal expansion blocks are in contact with an electrical resistance heater, each of the solid thermal expansion blocks being located between and attached to at least one of the protrusions on the first split surface and at least one of the protrusions on the second split surface, wherein in operation, for at least one of the solid thermal expansion blocks, the electrical resistance heater heats the solid thermal expansion block, causing expansion of the solid thermal expansion block in the longitudinal direction, thereby moving the split surfaces relative to each other in the longitudinal direction.

2. The system of claim 1, wherein the actuator is arranged between the split surfaces of the beam.

3. The system according to claim 1, wherein the beam has an airfoil shape.

4. The system according to claim 1, wherein the split along the longitudinal length of the beam is in a trailing edge of the beam.

5. The system according to claim 1, wherein the split along the longitudinal length of the beam is in a vertical spar of the beam.

6. The system according to claim 1, wherein the actuator is a shear-warp actuator.

7. The system according to claim 1, wherein the beam is an aircraft propeller, wing, control surface or rotor blade.

8. The system according to claim 1, wherein the beam is a helicopter rotor blade, turbine blade, underwater vehicle control surface, or robotic appendage.

9. The active twist hollow beam system according to claim 1, the system comprising a plurality of said actuators, each actuator arranged at a beam section at a different longitudinal position along the beam, each actuator independently controlled to induce different twist amounts to the beam sections.

10. The active twist hollow beam system of claim 1, the electrical resistance heater comprising an electrical resistance coil in contact with the solid thermal expansion blocks.

11. The active twist hollow beam system of claim 1, wherein the thermal expansion blocks comprise polyethylene.

12. The active twist hollow beam system of claim 1, wherein the mechanical compression blocks and the thermal expansion blocks comprise polyethylene.

13. The system according to claim 1, the beam having a first longitudinal spit in a forward section of the beam and having a second longitudinal split in an after section of the beam, and the actuator arranged to move the split surfaces of the forward and after sections of the beam in a longitudinal direction relative to each other along the length of the beam, causing the forward and after sections of the beam to warp.

14. The active twist hollow beam system of claim 1, wherein said attachment of each of the thermal expansion elements to a protrusion on the first split surface and a protrusion of a second split surface constrains the split surfaces from moving other than longitudinally with respect to each other.

\* \* \* \* \*